United States Patent
Xu et al.

(10) Patent No.: US 12,342,191 B2
(45) Date of Patent: *Jun. 24, 2025

(54) MEASUREMENT ENHANCEMENT IN RADIO RESOURCE CONTROL (RRC) CONNECTED FOR USER EQUIPMENT (UE)

(71) Applicant: Apple Inc., Cupertino, CA (US)

(72) Inventors: Fangli Xu, Beijing (CN); Dawei Zhang, Saratoga, CA (US); Dirk Nickisch, Oberpframmern (DE); Haijing Hu, Los Gatos, OR (US); Sarma V. Vangala, Campbell, CA (US); Sethuraman Gurumoorthy, San Ramon, CA (US); Sharad Sambhwani, San Diego, CA (US); Srirang A. Lovlekar, Fremont, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/442,669

(22) PCT Filed: Aug. 6, 2020

(86) PCT No.: PCT/CN2020/107514
§ 371 (c)(1),
(2) Date: Sep. 24, 2021

(87) PCT Pub. No.: WO2022/027481
PCT Pub. Date: Feb. 10, 2022

(65) Prior Publication Data
US 2023/0156496 A1    May 18, 2023

(51) Int. Cl.
*H04W 24/10*    (2009.01)
*H04W 24/08*    (2009.01)
*H04W 48/08*    (2009.01)

(52) U.S. Cl.
CPC ......... *H04W 24/08* (2013.01); *H04W 24/10* (2013.01); *H04W 48/08* (2013.01)

(58) Field of Classification Search
None
See application file for complete search history.

(56) References Cited

U.S. PATENT DOCUMENTS

2020/0015112 A1    1/2020 Kim et al.
2020/0029356 A1*   1/2020 Choi ............... H04L 5/0053
(Continued)

FOREIGN PATENT DOCUMENTS

CN    110753359 A    2/2020
CN    111213401 A    5/2020
(Continued)

OTHER PUBLICATIONS

International Preliminary Report on Patentability dated Feb. 7, 2023 in connection with Application Serial No. PCT/CN2020/107451.
International Preliminary Report on Patentability dated Feb. 7, 2023 in connection with Application Serial No. PCT/CN2020/107514.
"Technical Specification; 5G; NR; Radio Resource Control (RRC); Protocol Specification"; 3GPP TS 38.331 Version 15.9.0 (Release 15); ETSI TS 138 331; Apr. 2020.
(Continued)

*Primary Examiner* — Scott M Sciacca
(74) *Attorney, Agent, or Firm* — Eschweiler & Potashnik, LLC; Matthew W Glause

(57) ABSTRACT

Techniques discussed herein can facilitate enhancements to measurement for a User Equipment (UE) in Radio Resource Control (RRC) Connected mode for configuration of Carrier Aggregation (CA) and/or Dual Connectivity (DC). One example embodiment comprises a UE device comprising a processor configured to perform operations comprising: transmitting a UE Assistance Information message comprising a measurement request; receiving a first RRCReconfiguration message comprising a measConfig information element (IE); performing one or more measurements on each of on one or more frequencies based at least on the RRC measConfig IE, wherein the one or more frequencies com-
(Continued)

prise at least one non-serving frequency associated with a neighboring cell; transmitting a MeasurementReport message that indicates the one or more measurements for at least one of the one or more frequencies; and receiving a second RRCReconfiguration message that configures the UE with the at least one of the one or more frequencies.

20 Claims, 19 Drawing Sheets

(56) References Cited

U.S. PATENT DOCUMENTS

| | | | |
|---|---|---|---|
| 2020/0059343 | A1 | 2/2020 | Kim |
| 2020/0195398 | A1 | 6/2020 | Futaki |

FOREIGN PATENT DOCUMENTS

| | | |
|---|---|---|
| CN | 111418226 A | 7/2020 |
| CN | 111436060 | 7/2020 |
| WO | 2016122255 A1 | 8/2016 |
| WO | 2016144055 A1 | 9/2016 |
| WO | 2019034258 A1 | 2/2019 |
| WO | 2019108114 A1 | 6/2019 |
| WO | 2020033785 A1 | 2/2020 |
| WO | 2020128966 A1 | 6/2020 |
| WO | 2020151735 A1 | 7/2020 |

OTHER PUBLICATIONS

Notice of Allowance dated Apr. 29, 2024, for U.S. Appl. No. 17/442,683.
Ericsson; "CR for 38.331 on CA/DC Enhancements"; 3GPP Draft; R2-2006350; Jun. 25, 2020.
European Extended Search Report mailed Feb. 9, 2024 in connection with Application No. EP20948572.
International Search Report Dated May 11, 2021 for International Application PCT/CN2020/107451.
International Written Opinion Dated May 11, 2021 for International Application PCT/CN2020/107451.
Ericsson; "Subsequent RRC Procedures after DAPS Handover"; 3GPP TSG-RAN WG2; #109; R2-2000129; Mar. 6, 2020.
Samsung; "Remaining Issues for UE Procedures on SCG Failure"; 3GPP TSG-RAN WG2 # 99Meeting; R2-1709234; Aug. 11, 2017.
PCT Search Report dated Apr. 22, 2021 in connection with PCT Application No. PCT/CN2020/107508.
PCT Written Opinion dated Apr. 22, 2021 in connection with PCT Application No. PCT/CN2020/107508.
U.S. Appl. No. 17/442,683, filed Sep. 24, 2021.
Chinese Office action in connection with 202080104119.7 dated Aug. 28, 2024.
Chinese Office Action dated May 1, 2025 in connection with Application No. 2020801041197.

* cited by examiner

| Measurement Config | Description |
|---|---|
| Measurement object | For intra-frequency and inter-frequency measurements it indicates the frequency/time location and subcarrier spacing of reference signals to be measured. For inter-RAT E-UTRA measurements it is a single E-UTRA carrier frequency. |
| Reporting configuration | Reporting criterion: RS type: Reporting format: |
| Measurement identity/ies | Each measurement identity links one measurement object with one reporting configuration |
| Quantity configuration | The measurement filtering configuration used for all event evaluation and related reporting, and for periodical reporting of that measurement. |

*FIG. 7*

```
-- ASN1START
-- TAG-MEASCONFIG-START

MeasConfig ::=          SEQUENCE {
    measObjectToRemoveList      MeasObjectToRemoveList      OPTIONAL,   -- Need N
    measObjectToAddModList      MeasObjectToAddModList      OPTIONAL,   -- Need N
    reportConfigToRemoveList    ReportConfigToRemoveList    OPTIONAL,   -- Need N
    reportConfigToAddModList    ReportConfigToAddModList    OPTIONAL,   -- Need N
    measIdToRemoveList          MeasIdToRemoveList          OPTIONAL,   -- Need N
    measIdToAddModList          MeasIdToAddModList          OPTIONAL,   -- Need N
    s-MeasureConfig         CHOICE {
        ssb-RSRP                    RSRP-Range,
        csi-RSRP                    RSRP-Range
    },
    quantityConfig              QuantityConfig              OPTIONAL,   -- Need M
    measGapConfig               MeasGapConfig               OPTIONAL,   -- Need M
    measGapSharingConfig        MeasGapSharingConfig        OPTIONAL,   -- Need M
    ...
}

MeasObjectToRemoveList ::=   SEQUENCE (SIZE (1..maxNrofObjectId)) OF MeasObjectId MeasIdToRemoveList ::=       SEQUENCE (SIZE (1..maxNrofMeasId)) OF MeasId ReportConfigToRemoveList ::= SEQUENCE (SIZE (1..maxReportConfigId)) OF ReportConfigId

-- TAG-MEASCONFIG-STOP
-- ASN1STOP
```

FIG. 9

```
MeasResults ::=        SEQUENCE {
    measId                               MeasId,
    measResultServingMOList              MeasResultServMOList,
    measResultNeighCells                 CHOICE {
        measResultListNR                     MeasResultListNR,
        ...,
        measResultListEUTRA                  MeasResultListEUTRA
    }                                                                        OPTIONAL,
    ...,
    [[
    measResultServFreqListEUTRA-SCG      MeasResultServFreqListEUTRA-SCG     OPTIONAL,
    measResultServFreqListNR-SCG         MeasResultServFreqListNR-SCG        OPTIONAL,
    measResultSFTD-EUTRA                 MeasResultSFTD-EUTRA                OPTIONAL,
    measResultSFTD-NR                    MeasResultCellSFTD-NR               OPTIONAL
    ]]
}

MeasResultNR ::=       SEQUENCE {
    physCellId                           PhysCellId
    measResult                           SEQUENCE {
        cellResults                          SEQUENCE{
            resultsSSB-Cell                      MeasQuantityResults
            resultsCSI-RS-Cell                   MeasQuantityResults         OPTIONAL,
                                                                             OPTIONAL
        },
        rsIndexResults                       SEQUENCE{
            resultsSSB-Indexes                   ResultsPerSSB-IndexList     OPTIONAL,
            resultsCSI-RS-Indexes                ResultsPerCSI-RS-IndexList  OPTIONAL
        }
    },
    ...,
    [[
    cgi-Info                             CGI-InfoNR                          OPTIONAL
    ]]
}
```

FIG. 10

```
ReportConfigNR ::=         SEQUENCE {
    reportType                 CHOICE {
        periodical                 PeriodicalReportConfig,
        eventTriggered             EventTriggerConfig,
        ...,
        reportCGI                  ReportCGI,
        reportSFTD                 ReportSFTD-NR
        condTriggerConfig-r16      CondTriggerConfig-r16
        cli-Periodical-r16         CLI-PeriodicalReportConfig-r16
        cli-EventTriggered-r16     CLI-EventTriggerConfig-r16
        purpose-cadc               BOOLEAN
    }
}, EventTriggerConfig ::=     SEQUENCE {
    eventId                    CHOICE {
        ...
        eventAx                    SEQUENCE {
            aX-Offset                  MeasTriggerQuantityOffset,
            reportOnLeave              BOOLEAN,
            hysteresis                 Hysteresis,
            timeToTrigger              TimeToTrigger,
            useWhiteCellList           BOOLEAN
        }, // for CA/DC Purpose
        ...
    },
    ...
},
```

FIG. 13

```
MeasObjectNR ::=                                  SEQUENCE {
    ssbFrequency                                  ARFCN-ValueNR                                                       OPTIONAL,    -- Cond SSBorAssociatedSSB
    ssbSubcarrierSpacing                          SubcarrierSpacing                                                   OPTIONAL,    -- Cond SSBorAssociatedSSB
    smtc1                                         SSB-MTC                                                             OPTIONAL,    -- Cond SSBorAssociatedSSB
    smtc2                                         SSB-MTC2                                                            OPTIONAL,    -- Cond IntraFreqConnected
    refFreqCSI-RS                                 ARFCN-ValueNR                                                       OPTIONAL,    -- Cond CSI-RS
    referenceSignalConfig                         ReferenceSignalConfig,
    absThreshSS-BlocksConsolidation               ThresholdNR                                                         OPTIONAL,    -- Need R
    absThreshCSI-RS-Consolidation                 ThresholdNR                                                         OPTIONAL,    -- Need R
    nrofSS-BlocksToAverage                        INTEGER (2..maxNrofSS-BlocksToAverage)                              OPTIONAL,    -- Need R
    nrofCSI-RS-ResourcesToAverage                 INTEGER (2..maxNrofCSI-RS-ResourcesToAverage)                       OPTIONAL,    -- Need R
    quantityConfigIndex                           INTEGER (1..maxNrofQuantityConfig),
    offsetMO                                      Q-OffsetRangeList,
    cellsToRemoveList                             PCI-List                                                            OPTIONAL,    -- Need N
    cellsToAddModList                             CellsToAddModList                                                   OPTIONAL,    -- Need N
    blackCellsToRemoveList                        PCI-RangeIndexList                                                  OPTIONAL,    -- Need N
    blackCellsToAddModList                        SEQUENCE (SIZE (1..maxNrofPCI-Ranges)) OF PCI-RangeElement           OPTIONAL,    -- Need N
    whiteCellsToRemoveList                        PCI-RangeIndexList                                                  OPTIONAL,    -- Need N
    whiteCellsToAddModList                        SEQUENCE (SIZE (1..maxNrofPCI-Ranges)) OF PCI-RangeElement           OPTIONAL,    -- Need N
    ...,
    [[
    freqBandIndicatorNR                           FreqBandIndicatorNR                                                 OPTIONAL,    -- Need R
    measCycleSCell                                ENUMERATED {sf160, sf256, sf320, sf512, sf640, sf1024, sf1280}       OPTIONAL     -- Need R
    ]],
    [[
    smtc3list-r16                                 SSB-MTC3List-r16                                                    OPTIONAL,    -- Cond FFS
    rmtc-Config-r16                               SetupRelease {RMTC-Config-r16}                                      OPTIONAL,    -- Need M
    ssb-PositionQCL-Common-r16                    SSB-PositionQCL-Relationship-r16                                    OPTIONAL,    -- Need M
    ssb-PositionQCL-CellsToAddModList-r16         SSB-PositionQCL-CellsToAddModList-r16                               OPTIONAL,    -- Need N
    ssb-PositionQCL-CellsToRemoveList-r16         PCI-List                                                            OPTIONAL,    -- Need N
    t312-r16                                      SetupRelease { T312-r16 }                                           OPTIONAL,    -- Need M
    purpose-cadc                                  BOOLEAN
    ]]
}
```

FIG. 14

```
MeasObjectEUTRA ::=      SEQUENCE {
    carrierFreq                 ARFCN-ValueEUTRA,
    allowedMeasBandwidth        EUTRA-AllowedMeasBandwidth,
    cellsToRemoveListEUTRAN     EUTRA-CellIndexList                                          OPTIONAL,  -- Need N
    cellsToAddModListEUTRAN     SEQUENCE (SIZE (1..maxCellMeasEUTRA)) OF EUTRA-Cell          OPTIONAL,  -- Need N
    blackCellsToRemoveListEUTRAN EUTRA-CellIndexList                                         OPTIONAL,  -- Need N
    blackCellsToAddModListEUTRAN SEQUENCE (SIZE (1..maxCellMeasEUTRA)) OF EUTRA-BlackCell    OPTIONAL,  -- Need N
    eutra-PresenceAntennaPort1  EUTRA-PresenceAntennaPort1,
    eutra-Q-OffsetRange         EUTRA-Q-OffsetRange                                          OPTIONAL,  -- Need R
    widebandRSRQ-Meas           BOOLEAN,
    purpose-cadc                BOOLEAN
    ...
}
```

FIG. 15

MEASUREMENT ENHANCEMENT IN RADIO RESOURCE CONTROL (RRC) CONNECTED FOR USER EQUIPMENT (UE)

REFERENCE TO RELATED APPLICATIONS

This application is a National Phase entry application of International Patent Application No. PCT/CN2020/107514 filed Aug. 6, 2020, entitled "MEASUREMENT ENHANCEMENT IN RADIO RESOURCE CONTROL (RRC) CONNECTED FOR USER EQUIPMENT (UE)", the contents of which are herein incorporated by reference in their entirety.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

BRIEF DESCRIPTION OF THE DRAWINGS

FIG. 7 is a table showing measurement configurations for a measurement report, along with associated descriptions, in connection with various aspects discussed herein.

FIG. 9 illustrates the MeasConfig Information Element (IE), which specifies measurements to be performed by the UE, in connection with various aspects discussed herein.

FIG. 10 illustrates the MeasResults IE and the MeasResultNR IE, which cover measured results for intra-frequency, inter-frequency, and inter-RAT mobility, in connection with various aspects discussed herein.

FIG. 13 illustrates examples of ReportConfigNR and EventTriggerConfig IEs that have been updated to indicate the CA/DC purpose, in connection with various aspects discussed herein.

FIG. 14 illustrates an example of a MeasObjectNR IE that has been updated to indicate the CA/DC purpose, in connection with various aspects discussed herein.

FIG. 15 illustrates an example of a MeasObjectEUTRA IE that has been updated to indicate the CA/DC purpose, in connection with various aspects discussed herein.

DETAILED DESCRIPTION

Figure 1:
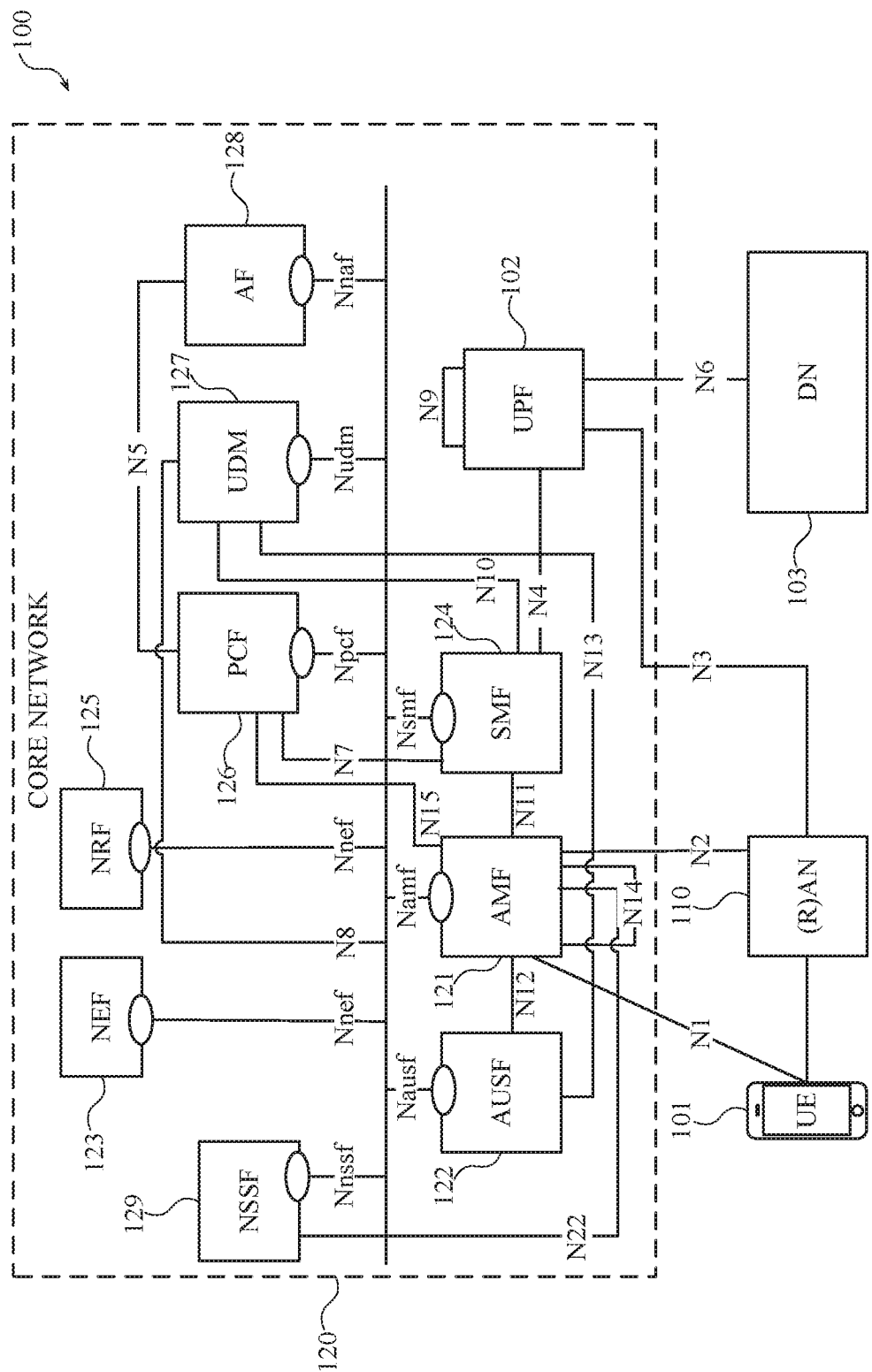
FIG. 1 is a block diagram illustrating an architecture of a system including a Core Network (CN), for example a Fifth Generation (5G) CN (5GC), in accordance with various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects described herein can be implemented into a system using any suitably configured hardware and/or software. FIG. 1 illustrates an architecture of a system 100 including a Core Network (CN) 120, for example a Fifth Generation (5G) CN (5GC), in accordance with various aspects. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129, which can be connected by various interfaces and/or reference points, for example, as shown in FIG. 1.

Figure 2:
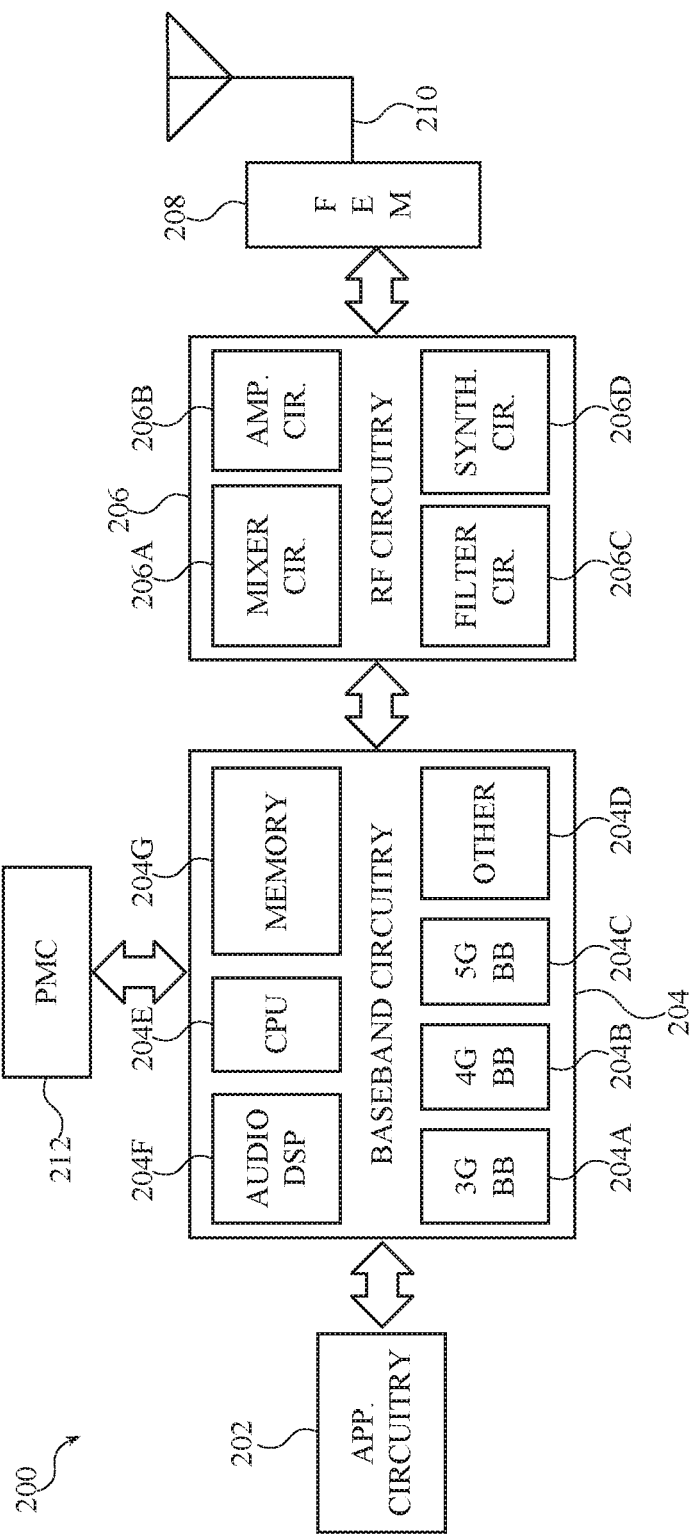
FIG. 2 is a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node may not utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EUTRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the applications processor 202 depending on the desired output frequency. In some aspects, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM 208, or in both the RF circuitry 206 and the FEM 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 may be additionally or alternatively coupled with, and perform similar power management operations for, other components such as, but not limited to, application circuitry 202, RF circuitry 206, or FEM 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
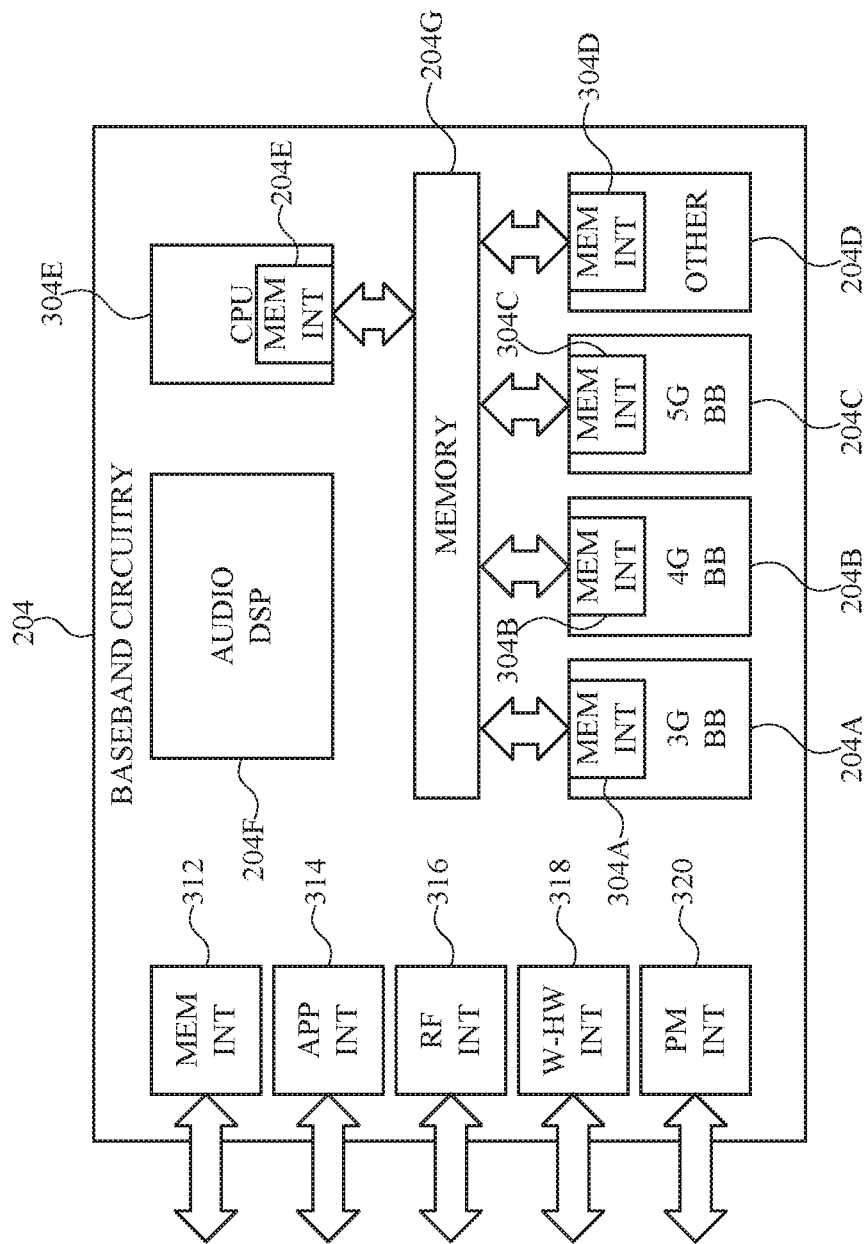
FIG. 3 is a diagram illustrating example interfaces of baseband circuitry that can be employed in accordance with various aspects discussed herein.

FIG. 3 illustrates example interfaces of baseband circuitry in accordance with some aspects. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

As discussed in greater detail herein, various aspects, which can be employed, for example, at a UE, can facilitate power management in connection with wireless modem(s). Various aspects can employ power management techniques discussed herein, wherein, based on monitored levels of power consumption and temperature, one or more power management stages discussed herein can be employed to mitigate overheating. Power management stages discussed herein can reduce power consumption and associated overheating caused by 5G (Fifth Generation) NR (New Radio) operation, LTE (Long Term Evolution) operation, or both.

Figure 4:
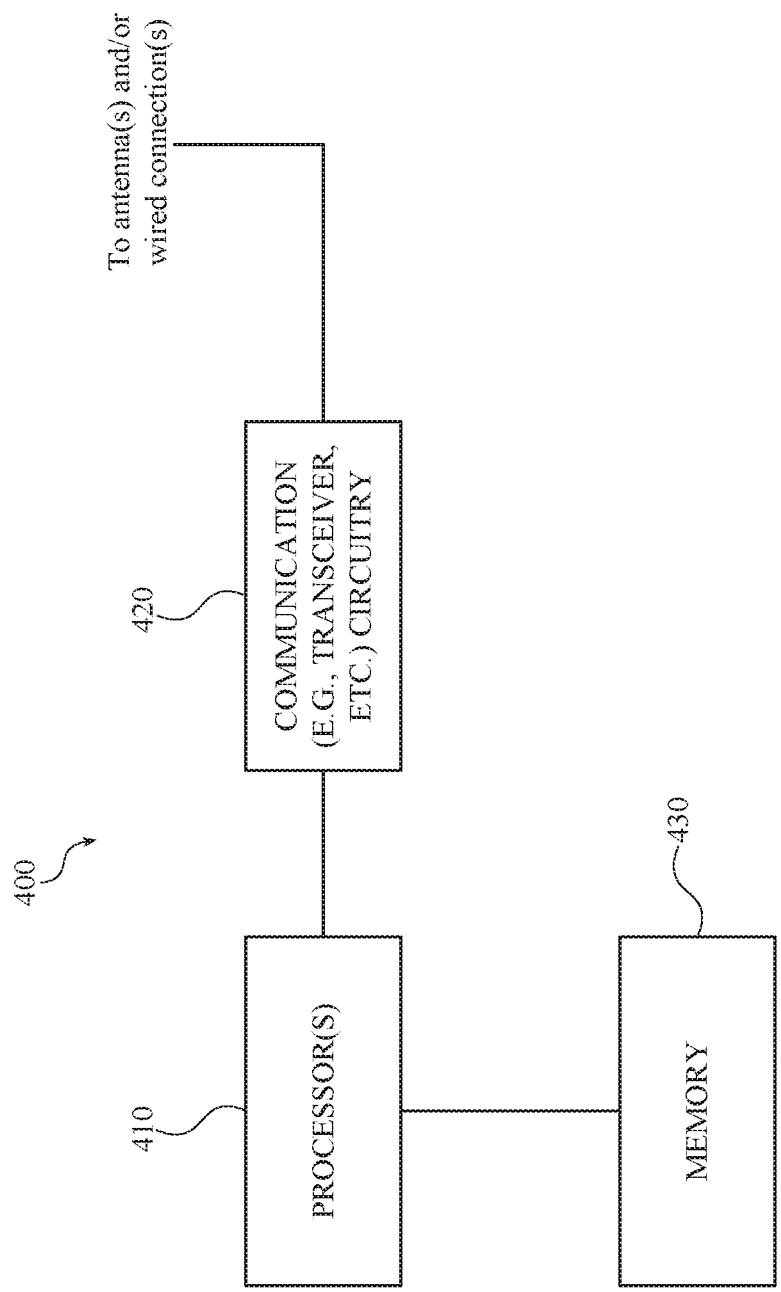
FIG. 4 is a block diagram illustrating a system that facilitates enhancements to measurement for a Radio Resource Control (RRC) Connected Mode UE that can facilitate DC/CA configuration, according to various aspects discussed herein.

Referring to FIG. 4, illustrated is a block diagram of a system 400 employable at a UE (User Equipment), a Base Station (BS, such as a next generation Node B (gNodeB or gNB), evolved Node B (eNB), or other BS (base station)/ TRP (Transmit/Receive Point)), or another component of a 3GPP (Third Generation Partnership Project) network (e.g., a 5GC (Fifth Generation Core Network)) component or function such as a UPF (User Plane Function)) that facilitates enhancements to measurement for a Radio Resource Control (RRC) Connected Mode UE that can facilitate DC/CA configuration, according to various aspects discussed herein. System 400 can include processor(s) 410, communication circuitry 420, and memory 430. Processor(s) 410 (e.g., which can comprise one or more of 202 and/or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/ constructions, etc.), and can store instructions and/or data associated with one or more of processor(s) 410 or transceiver circuitry 420).

Specific types of aspects of system 400 (e.g., UE aspects, etc.) can be indicated via subscripts (e.g., system $400_{UE}$ comprising processor(s) $410_{UE}$, communication circuitry $420_{UE}$, and memory $430_{UE}$). In some aspects, such as BS aspects (e.g., system $400_{BS}$) and network component (e.g., UPF (User Plane Function), etc.) aspects (e.g., system $400_{UPF}$) processor(s) $410_{BS}$ (etc.), communication circuitry (e.g., $420_{BS}$, etc.), and memory (e.g., $430_{BS}$, etc.) can be in a single device or can be included in different devices, such as part of a distributed architecture. In aspects, signaling or messaging between different aspects of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{BS}$, transmitted by communication circuitry $420_{BS}$, received by communication circuitry $420_{UE}$, and processed by processor(s) $410_{UE}$). Depending on the type of information, features, parameters, etc., the type of signaling employed and/or the exact details of the operations performed at the UE and/or BS in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

Figure 5:
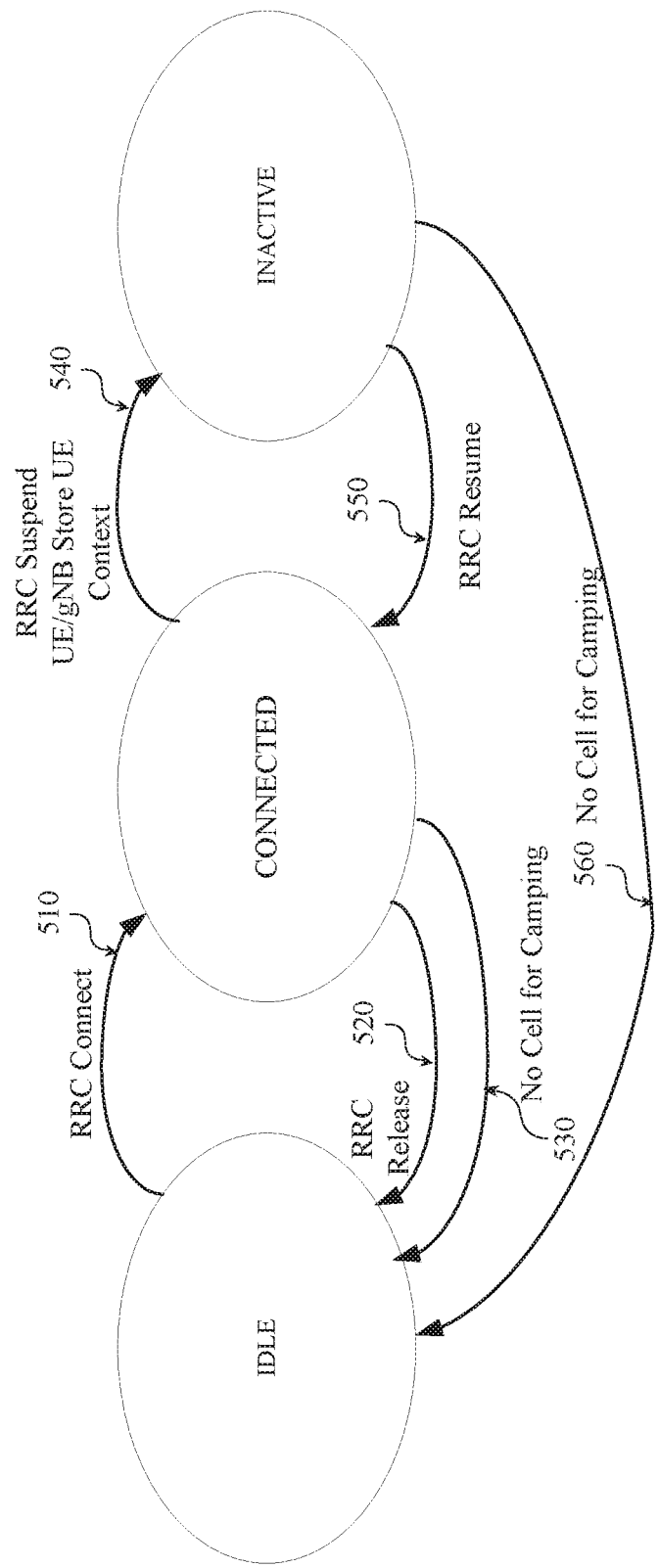
FIG. 5 is a state diagram illustrating the three radio resource control (RRC) states in which a UE may operate, in connection with various aspects discussed herein.

Referring to FIG. 5, illustrated is a state diagram illustrating the three radio resource control (RRC) states in which a UE may operate, in connection with various aspects discussed herein. In the IDLE state, the UE is disconnected from the core network (CN). While in IDLE the UE performs cell re-selection and can receive paging messages from the CN by way of the cell on which the UE is camping. To enter the CONNECTED state, the UE performs an RRC Connect process 510 in which the UE uses the random access channel (RACH) process to connect to the CN and radio access network (RAN). In the CONNECTED state, the UE is connected to and registered with the CN. Control and User plane connections are established between the RAN and the CN for the UE. The RAN is aware of which cell the UE belongs to and all parameters necessary for unicast communication between the UE and RAN are known to both the UE and the RAN. A UE context that includes an access stratum (AS) context of the UE (e.g., the UE's cell radio network temporary identifier (C-RNTI), and Cell Identity of the Primary Cell) and an RRC configuration for the UE (e.g., radio bearer and security information) are stored in the RAN and also in the UE.

From the CONNECTED state, the UE may move back to the IDLE state by performing an RRC Release process 520. When the UE returns to the IDLE state, the UE context is deleted from the UE and the RAN. The UE may also enter the IDLE state by default from either the CONNECTED state or the INACTIVE state when a cell for camping cannot be found as indicated by 530, 560.

The INACTIVE state was introduced in 5G to provide an intermediate state between the IDLE and CONNECTED states that would expedite the re-connection process by eliminating some of the signaling used to transition from the IDLE state to the CONNECTED state. The INACTIVE state is beneficial for UEs that infrequently communicate with the RAN and allows for power saving as compared to these UEs remaining in the CONNECTED state. To enter the INACTIVE state, the UE performs an RRC Release process with Suspend configuration 540 in which the UE context is stored by both the UE and the serving gNB. In the INACTIVE state, the UE still has a non-access stratum (NAS) connection with the CN (i.e., is still in a connection management (CM)-CONNECTED state as opposed to the IDLE state in which the UE is not CM-CONNECTED).

While in the INACTIVE state, the UE may move within a RAN notification area (RNA) without notifying the RAN, perform cell re-selection, and receive paging messages from the RAN. However, the UE does not have dedicated AS resources for performing unicast communication and thus cannot perform any dedicated data transmission or reception. Since the UE cannot perform dedicated data reception while in INACTIVE state, when downlink data is to be transmitted to the UE, the RAN pages the UE to trigger the UE to enter the CONNECTED state. When the UE has uplink data to be transmitted, the UE enters the CONNECTED state first before transmitting the uplink data.

To enter the CONNECTED state from the INACTIVE state, the UE performs an RRC Resume process 550 in which the AS context and RRC configuration are restored to the UE and the (new) serving cell. This expedites the transition to the CONNECTED state as compared to transitioning from the IDLE state from the CONNECTED state by allowing resumption of the previous connection without having to perform extensive signaling.

Figure 6:
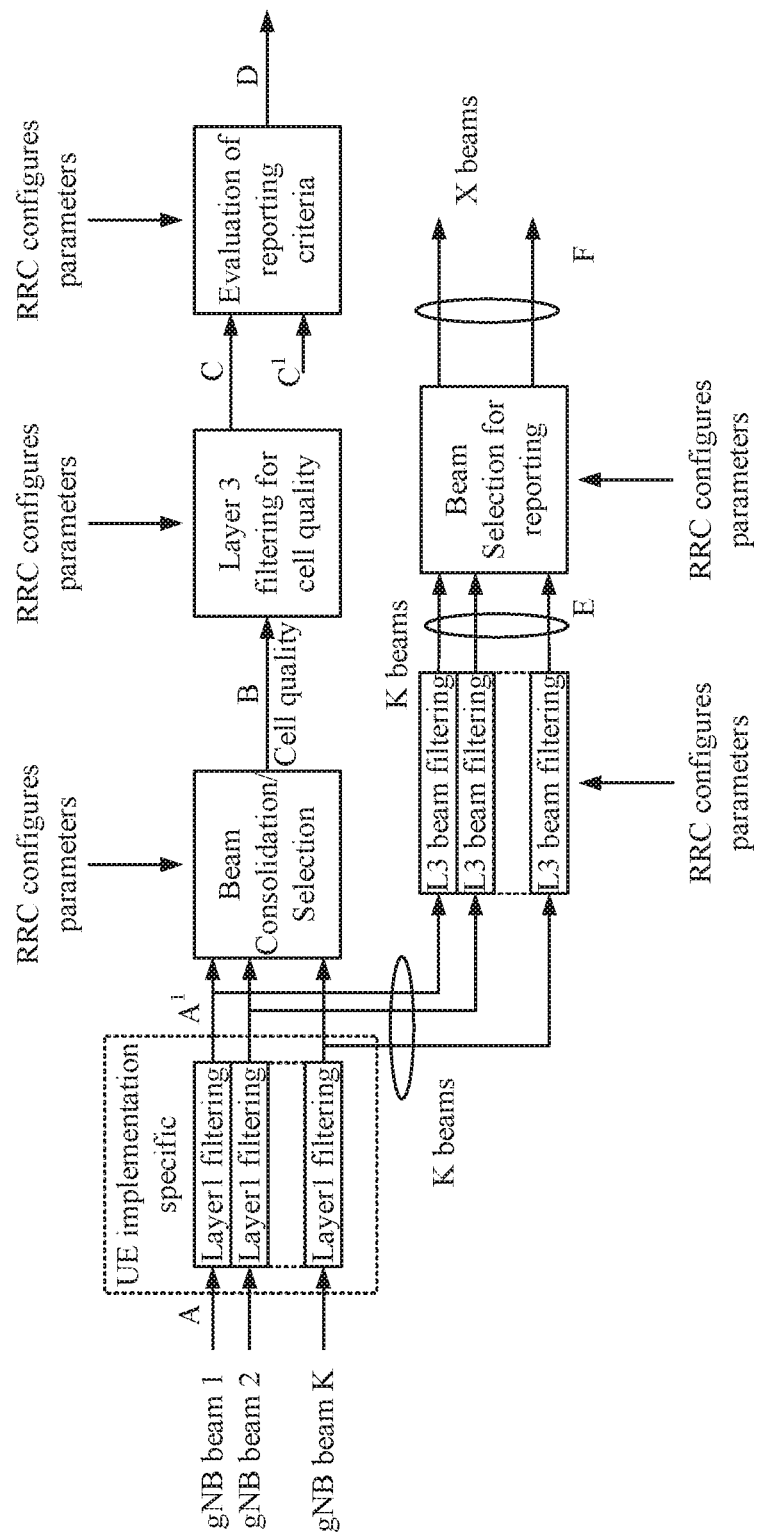
FIG. 6 is a diagram showing a measurement model for a Radio Resource Control (RRC) Connected mode UE based on K beams from a gNB (or other BS), in connection with various aspects discussed herein.

Referring to FIG. 6, illustrated is a diagram showing a measurement model for a Radio Resource Control (RRC) Connected mode UE based on K beams from a gNB (or other BS), in connection with various aspects discussed herein.

Referring to FIG. 7, illustrated is a table showing measurement configurations for a measurement report, along with associated descriptions, in connection with various aspects discussed herein.

Figure 8:
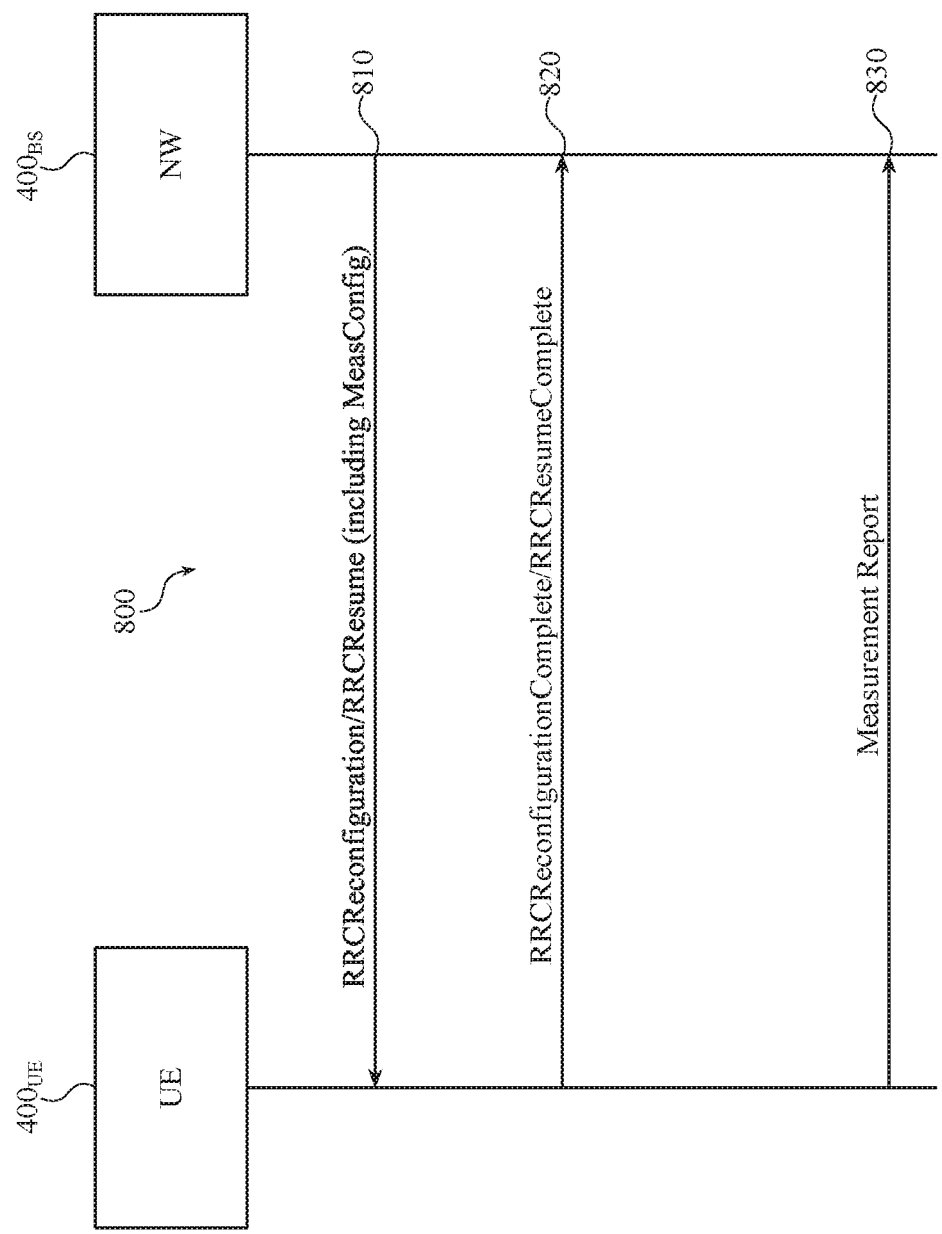
FIG. 8 illustrates a flow diagram showing an example method employable by a UE and NW of configuring and transmitting a measurement report, in connection with various aspects discussed herein.

Referring to FIG. 8, illustrated is a flow diagram showing an example method 800 employable by a UE 400$_{UE}$ and NW 400$_{BS}$ of configuring and transmitting a measurement report, in connection with various aspects discussed herein. At 810, method 800 can comprise the NW (e.g., via a BS such as a gNB, etc.) transmitting to a UE one or more of a RRCReconfiguration or RRCResume message that can comprise a measurement configuration (e.g., via a measConfig Information Element (IE)). At 820, the RRCReconfiguration/RRCResume procedure can be completed, and the UE can perform measurements based on the measurement configuration. At 830, the UE can transmit to the NW a measurement report that indicates the results of the measurements that were performed.

However, existing measurement techniques are targeted for mobility, and are not optimized for configuration of Dual Connectivity (DC) and/or Carrier Aggregation (CA).

The NW may configure an RRC_CONNECTED UE to perform measurements and report them in accordance with a measurement configuration indicated via a MeasConfig Information Element (IE). The measurement configuration can be provided by means of dedicated signaling (e.g., RRCReconfiguration or RRCResume).

The CONNECTED UE can generate and transmit a Measurement Report (MR) with one or more of the following characteristics: (1) The MR can comprise the measurement identity of the associated measurement configuration that triggered the reporting; (2) Cell and beam measurement quantities to be included in measurement reports are configured by the network; (3) The number of non-serving cells to be reported can be limited through configuration by the network; (4) Cells belonging to a blacklist (when configured by the network) are not used in event evaluation and reporting, and when a whitelist is configured by the network, only the cells belonging to the whitelist are used in event evaluation and reporting; (5) Beam measurements to be included in measurement reports are configured by the network (e.g., beam identifier only, measurement result and beam identifier, or no beam reporting).

Whether a measurement is non-gap-assisted or gap-assisted depends on the capability of the UE, the active Bandwidth Part (BWP) of the UE and the current operating frequency. In non-gap-assisted scenarios, the UE is able to carry out such measurements without measurement gaps. In gap-assisted scenarios, the UE cannot be assumed to be able to carry out such measurements without measurement gaps.

For event triggered or periodical measurement report, UE can include reportAddNeighMeas in the measurement report. For reportAddNeighMeas, the UE includes the measurement result of the best neighbor cell on the serving frequencies.

Because existing measurements are targeted for mobility instead of for configuration of Dual Connectivity (DC) and/or Carrier Aggregation (CA), they do not provide for measurements of neighboring cells on non-serving frequencies.

Referring to FIG. 9, shown is the MeasConfig IE, which specifies measurements to be performed by the UE, in connection with various aspects discussed herein. Referring to FIG. 10, shown is the MeasResults IE and the MeasResultNR IE, which cover measured results for intra-frequency, inter-frequency, and inter-RAT mobility, in connection with various aspects discussed herein.

Existing measurement techniques are not adapted for configuration of DC/CA. In some NW policies, the NW DC/CA configuration relies on the measurement configuration.

Normally, for CONNECTED UE, NW will perform the Primary Cell (PCell) change, Secondary Cell (SCell) addition, and Secondary Cell Group (SCG) addition based on the UE measurement report on the non-serving cells. In other words, if the NW does not configure the neighbor cell measurement, NW will not perform such RRCReconfiguration.

Currently, in the LTE networks of some NW vendors, the NW only configures the inter-RAT (Radio Access Technology) NR measurement configuration when the UE initially accesses to NW. If the UE does not report the NR measurement report for some time, the NW will delete the measurement configuration. The main motivation for the NW to delete the measurement configuration is that the NR measurement may involve a measurement gap, which would lead to the interruption of ongoing transmissions.

Thus, a first problem with existing techniques is that the lack of measurement configuration will block NW to enable the DC/CA configuration, regardless of whether the DC/CA configuration is more suitable to the latest UE situation or not, such as in the following cases: (1) UE triggers new service; (2) UE enters LTE+NR overlapped coverage; and/or (3) The data amount for transmission becomes larger.

Additionally, existing MR reporting can piggyback the MR of the serving frequencies, but cannot carry potential frequencies for CA/DC.

In existing systems, the CONNECTED UE is only allowed to report the best neighbor cell on the serving frequencies together with the measurement report to NW, and the motivation to introduce these measurement results is for the mobility handover purpose. For example, during the handover preparation phase, the source node can provide all the measurement results to the target node, and target node can select one cell as the target PCell.

Thus, a second problem with existing systems is that, for the measurement report triggered by the A3 event (Neighbor becomes amount of offset better than PCell/PSCell) and/or A5 event (PCell/PSCell becomes worse than absolute threshold1 AND Neighbour/SCell becomes better than another absolute threshold2), the NW can decide the target PCell based on it, but cannot decide the SCG/SCell for CA/DC configuration based on this measurement report, since the measurement result can only reflect the best neighbor cell on the current serving frequencies, and will not reflect the best cells on the potential CA/DC secondary component carrier.

Figure 11:
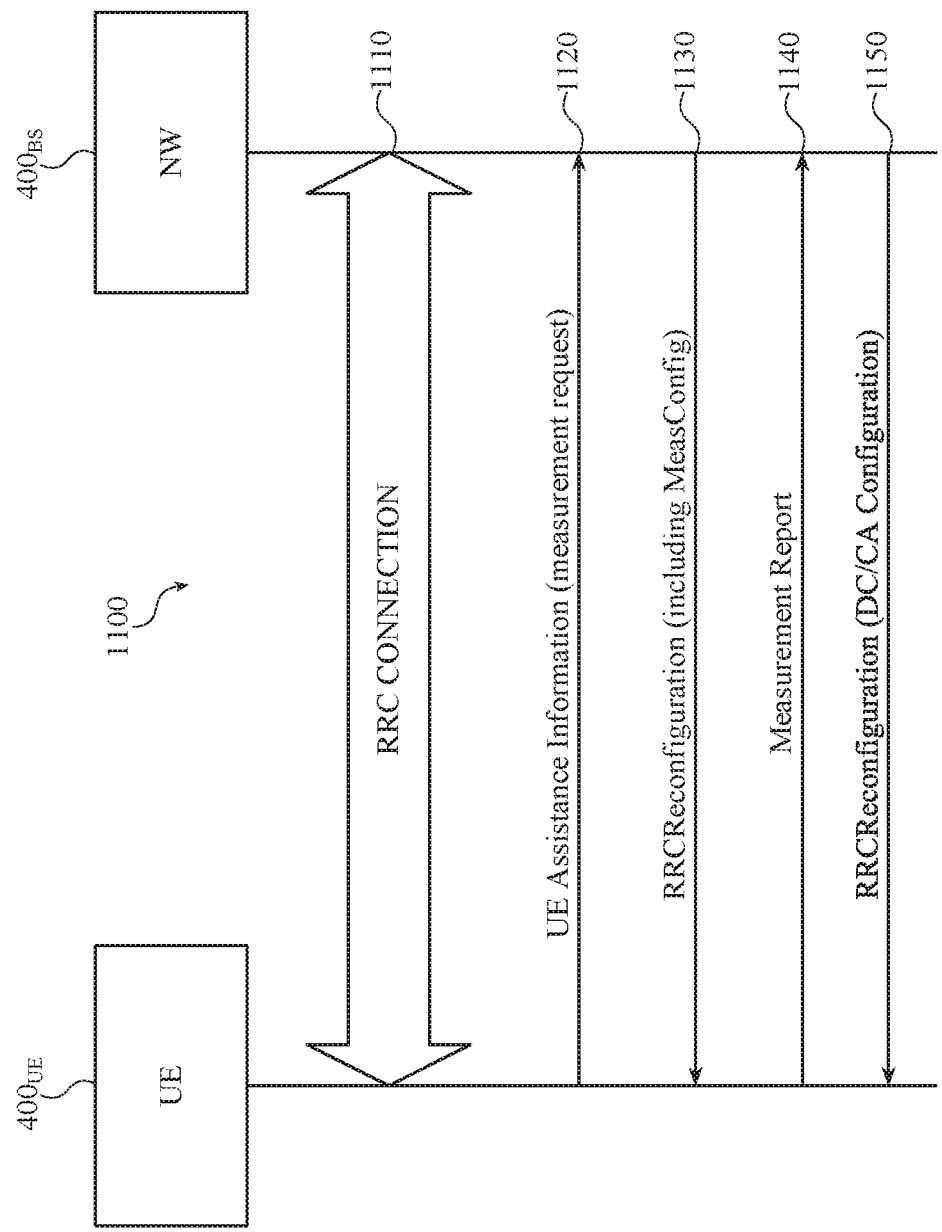
FIG. 11 illustrates a flow diagram of a first example method that facilitates enhancements to measurement reporting for a Connected mode UE that can facilitate DC/CA configuration, in connection with various aspects discussed herein.

Referring to FIG. 11, illustrated is a flow diagram of a first example method 1100 that facilitates enhancements to measurement reporting for a Connected mode UE that can facilitate DC/CA configuration, in connection with various aspects discussed herein. Method 1100 provides a first example technique that can solve the first problem, wherein a lack of measurement configuration will block the NW in existing systems from enabling a DC/CA configuration even when more suitable for a UE.

In contrast to existing systems, various embodiments discussed herein can employ example method 1100 and/or related techniques to facilitate measurement on potential frequencies for DC/CA configuration(s). In connection with method 1100, an RRC Connection can be established (or already in place) for the UE as shown at 1110.

Method 1100 can be employed in scenarios wherein a if a CONNECTED UE prefers to have a CA/DC configuration, but has no measurement configuration associated with a neighbor cell.

At 1120, the UE (e.g., comprising $400_{UE}$) can generate and transmit a UE Assistance Information message comprising a measurement request to a BS (e.g., comprising $400_{BS}$) of the NW. Depending on the embodiment, the request can comprise or indicate one or more of the following types of information: (1) a 1 bit indication of the measurement request; (2) an indication of the Radio Access Technology (RAT) for measurement (e.g., EUTRA, NR, etc.), (3) one or more frequencies/bands for measurement; and/or (4) one or more frequencies/bands for measurement without a measurement gap.

At 1130, in response to the measurement request, the BS can generate and transmit a RRCReconfiguration message comprising a MeasConfig that configures the requested measurement(s).

The UE can perform the configured measurements, and at 1140, the UE can generate and transmit a measurement report to the BS that indicates the configured measurements on the potential CA/DC frequencies/bands.

At 1150, the BS can generate and transmit a RRCReconfiguration message to the UE that comprises a DC/CA configuration including at least one of the potential CA/DC frequencies/bands configured at 1130 and indicated in the measurement report of 1140.

Figure 12:
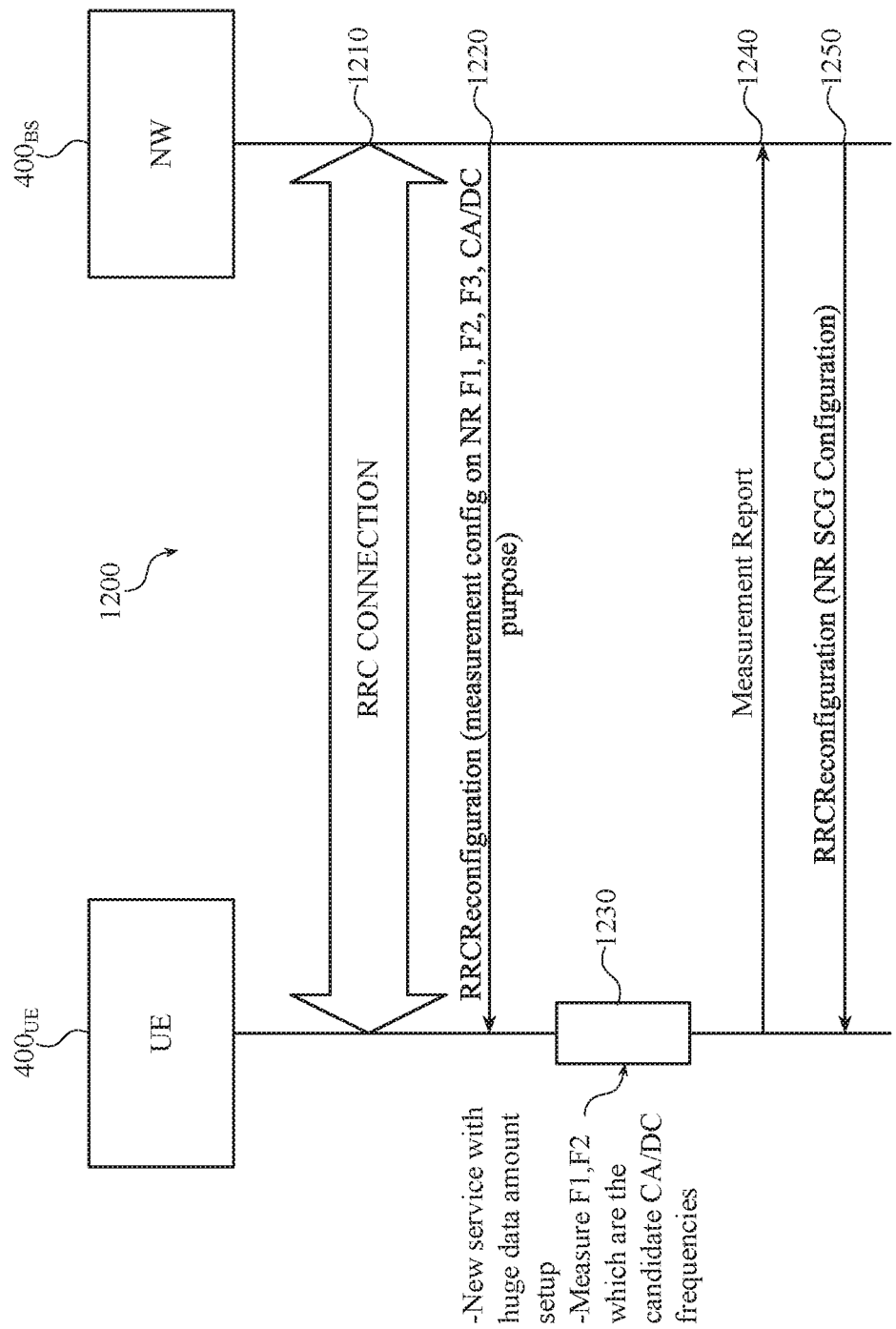
FIG. 12 illustrates a flow diagram of a second example method that facilitates enhancements to measurement reporting for a Connected mode UE that can facilitate DC/CA configuration, in connection with various aspects discussed herein.

Referring to FIG. 12, illustrated is a flow diagram of a second example method 1200 that facilitates enhancements to measurement reporting for a Connected mode UE that can facilitate DC/CA configuration, in connection with various aspects discussed herein. Method 1200 provides a second example technique that can solve the first problem, wherein a lack of measurement configuration will block the NW in existing systems from enabling a DC/CA configuration even when more suitable for a UE.

In connection with method 1200, an RRC Connection can be established (or already in place) for the UE (e.g., employing $400_{UE}$, etc.) as shown at 1210.

At 1220, the BS (e.g., employing $400_{BS}$, etc.) can generate and transmit a RRCReconfiguration message comprising a MeasConfig that configures one or more measurement(s) that include measurement on potential CA/DC frequencies (e.g., F1 and F2 in FIG. 12, etc.), wherein the measurement configuration(s) can be for a CA/DC purpose, and can indicate the CA/DC purpose. The purpose can be indicated in one of the configuration of the measurement report or the measurement object. In embodiments wherein the DC/CA purpose configuration is indicated in the report configuration, it can be indicated in the ReportConfigNR IE, or a new event Ax can be introduced for the CA/DC purpose. Referring to FIG. 13, shown are examples of ReportConfigNR and EventTriggerConfig IEs (portions of the latter have been omitted) that have been updated to indicate the CA/DC purpose, in connection with various aspects discussed herein. Referring to FIG. 14, shown is an example of a MeasObjectNR IE that has been updated to indicate the CA/DC purpose, in connection with various aspects discussed herein. Referring to FIG. 15, shown is an example of a MeasObjectEUTRA IE that has been updated to indicate the CA/DC purpose, in connection with various aspects discussed herein.

Referring again to FIG. 12, the UE can perform the configured measurements at 1230, including on potential frequencies for CA/DC.

At 1240, the UE can generate and transmit a measurement report to the BS that indicates the configured measurements on the potential CA/DC frequencies/bands.

At 1250, the BS can generate and transmit a RRCReconfiguration message to the UE that comprises a NR Secondary Cell Group (SCG) configuration including at least one of the potential CA/DC frequencies/bands configured at 1220 and indicated in the measurement report of 1240.

Figure 16:
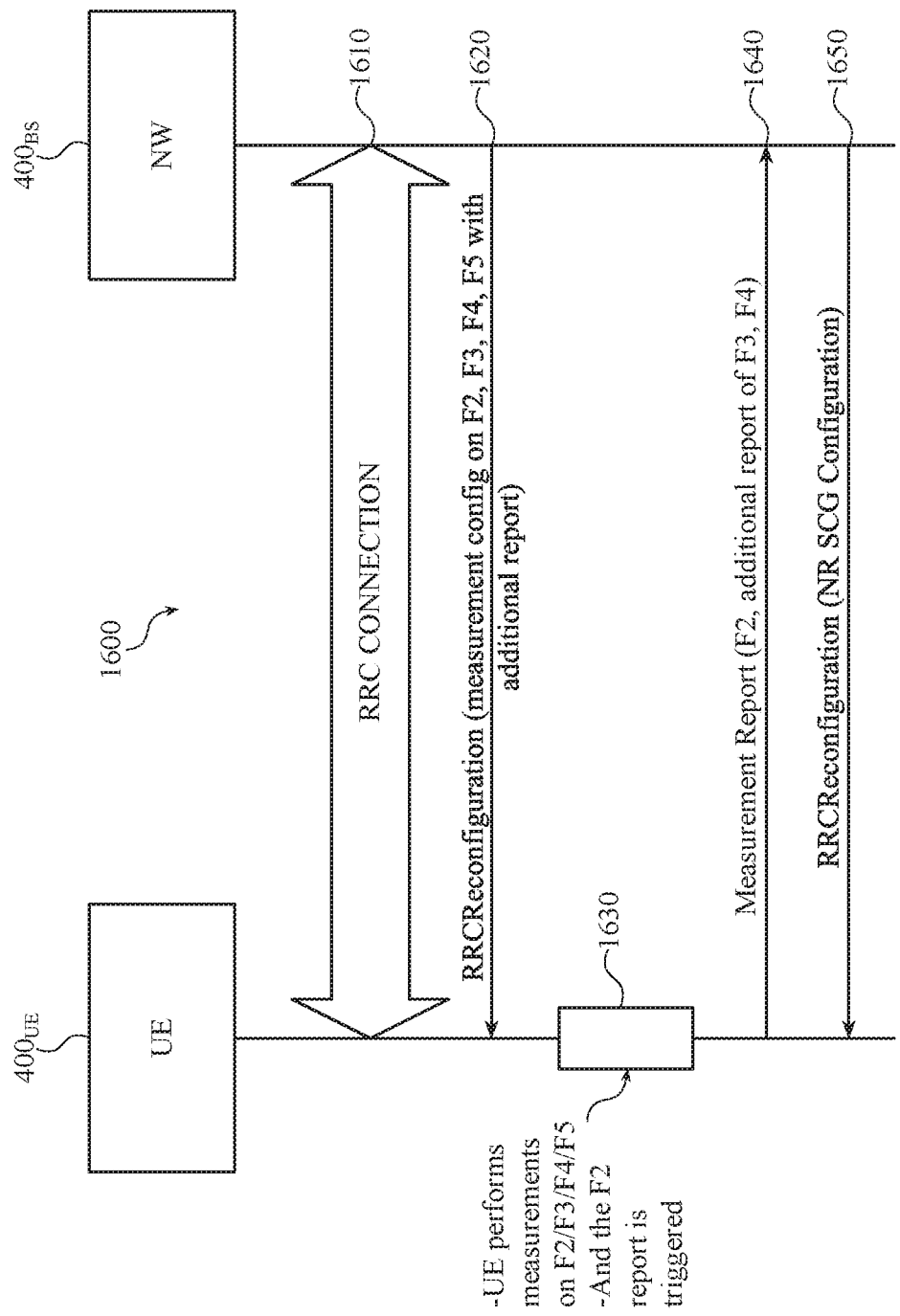
FIG. 16 illustrates a flow diagram of a third example method that facilitates enhancements to measurement reporting for a Connected mode UE that can facilitate DC/CA configuration, in connection with various aspects discussed herein.

Referring to FIG. 16, illustrated is a flow diagram of a third example method 1600 that facilitates enhancements to measurement reporting for a Connected mode UE that can facilitate DC/CA configuration, in connection with various aspects discussed herein. Method 1600 provides a first example technique that can solve the second problem, wherein for a measurement report triggered by the A3/A5 event(s), the NW in existing systems can decide the target PCell based on it, but cannot decide the SCG/SCell for CA/DC configuration based on this measurement report, since the measurement result can only reflect the best neighbor cell on the current serving frequencies, and will not reflect the best cells on the potential CA/DC secondary component carrier, as existing systems only provide for reporting the best non-serving cell on the serving frequency for neighboring cells.

In connection with method 1600, an RRC Connection can be established (or already in place) for the UE (e.g., employing $400_{UE}$, etc.) as shown at 1610.

At 1620, the BS (e.g., employing $400_{BS}$, etc.) can generate and transmit a RRCReconfiguration message comprising a MeasConfig that configures one or more measurement(s) that include measurement on a first set of frequencies associated with a triggered measurement report (e.g., F2 in FIG. 16), as well as one or more candidate CA/DC frequencies (e.g., F3, F4, and F5 in FIG. 16, etc.). In various embodiments, the first set of frequencies and the one or more candidate CA/DC frequencies can belong to a band combination supported by the UE. In some scenarios, the first set of frequencies can correspond to neighbor frequencies, while in other scenarios it can comprise serving frequencies.

The measurement configuration can indicate one or more frequencies (e.g., the candidate CA/DC frequencies, etc.) to be carried as an additional measurement report. In some embodiments, the NW (e.g., via the BS) can configure frequencies (e.g., the candidate CA/DC frequencies) to be carried as an additional measurement report, for example, in the measurement object for the first set of frequencies (e.g., F2). In some embodiments, the NW can configure measurement object(s) for measurement on the candidate CA/DC frequencies (e.g., F3, F4, or F5) similarly to existing measurement objects.

At 1630, the UE can perform the configured measurements, including on configured candidate frequencies for CA/DC.

At 1640, the UE can generate and transmit a measurement report to the BS that indicates the configured measurement on the first set of frequencies, as well as on one or more of the potential CA/DC frequencies/bands. In various embodiments, the NW can configure (e.g., at 1620) criteria for the UE to determine which frequency/ies from the potential/candidate CA/DC set can be provided as additional report(s). For example, the NW can configure a radio link quality threshold (e.g., Reference Signal (RS) Received Power (RSRP)/RS Received Quality (RSRQ)/Signal-to-Interference-plus-Noise Ratio (SINR), etc.), and if the quality for one set of frequencies (e.g., F3) is greater than the threshold while the quality for another set of frequencies (e.g., F4) is below the threshold, the UE can include the set of frequencies with quality greater than the threshold (e.g., F3) and the associated result in the additional report, while omitting those below the threshold (e.g., F4).

At 1650, the BS can generate and transmit a RRCReconfiguration message to the UE that comprises a NR SCG configuration and/or SCell configuration that includes at least one of the potential CA/DC frequencies/bands configured at 1620 and indicated in the measurement report of 1640.

Figure 17:
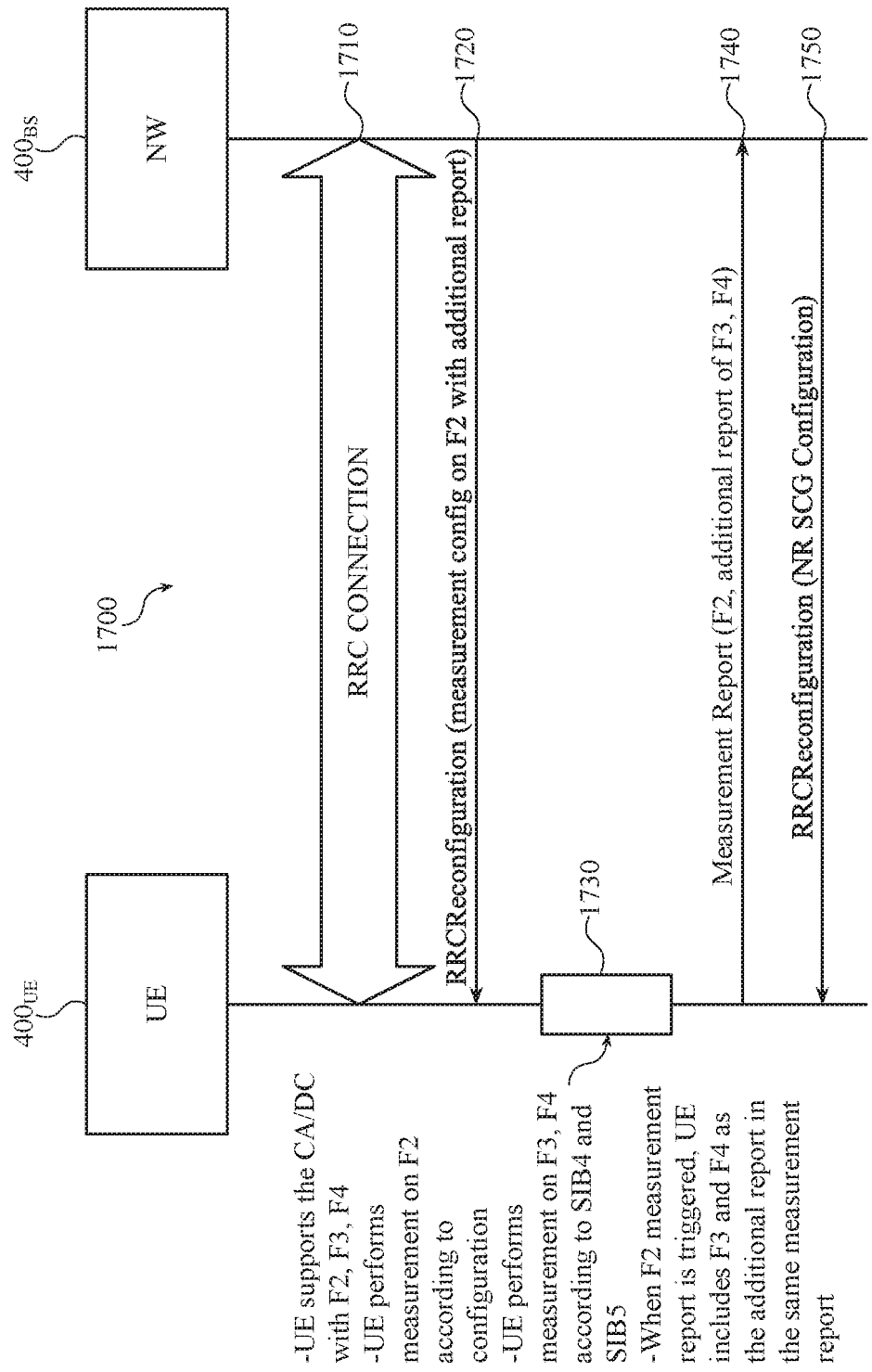
FIG. 17 illustrates a flow diagram of a fourth example method that facilitates enhancements to measurement reporting for a Connected mode UE that can facilitate DC/CA configuration, in connection with various aspects discussed herein.

Referring to FIG. 17, illustrated is a flow diagram of a fourth example method 1600 that facilitates enhancements to measurement reporting for a Connected mode UE that can facilitate DC/CA configuration, in connection with various aspects discussed herein. Method 1700 provides a second example technique that can solve the second problem, wherein for a measurement report triggered by the A3/A5 event(s), the NW in existing systems can decide the target PCell based on it, but cannot decide the SCG/SCell for CA/DC configuration based on this measurement report, since the measurement result can only reflect the best neighbor cell on the current serving frequencies, and will not reflect the best cells on the potential CA/DC secondary component carrier, as existing systems only provide for reporting the best non-serving cell on the serving frequency for neighboring cells. Method 1700 can be similar to method 1600, but can omit the detailed dedicated configuration provided at 1620. Instead, the NW can provide a In connection with method 1700, an RRC Connection can be established (or already in place) for the UE (e.g., employing 400$_{UE}$, etc.) as shown at 1710.

At 1720, the BS (e.g., employing 400$_{BS}$, etc.) can generate and transmit a RRCReconfiguration message comprising a MeasConfig that configures measurement on a first set of frequencies associated with a triggered measurement report (e.g., F2 in FIG. 17), and allows for additional reporting of one or more candidate CA/DC frequencies (e.g., F3 and F4 in FIG. 17, etc.). In various embodiments, the NW (e.g., via the BS) can provide a threshold (e.g., for radio link quality) for the UE to determine which potential/candidate CA/DC frequencies can be included as additional report(s).

At 1730, the UE can perform the configured measurements, including on one or more candidate frequencies for CA/DC. In some embodiments, the candidate frequencies for CA/DC can be determined by the UE based on System Information Block(s) generated by the BS (e.g., SIB4 and SIB5, etc.). In some embodiments, the candidate frequencies for CA/DC can be determined according to any UE knowledge, which can vary based on UE implementation.

At 1740, the UE can generate and transmit a measurement report to the BS that indicates the configured measurement on the first set of frequencies (e.g., F2), as well as on one or more of the potential CA/DC frequencies/bands. In various embodiments, the NW can configure (e.g., at 1620) criteria for the UE to determine which frequency/ies from the potential/candidate CA/DC set can be provided as additional report(s). For example, the NW can configure a radio link quality threshold (e.g., Reference Signal (RS) Received Power (RSRP)/RS Received Quality (RSRQ)/Signal-to-Interference-plus-Noise Ratio (SINR), etc.), and the UE can include any set(s) of frequencies with quality greater than the threshold (e.g., F3 and F4, etc.) and the associated result in the additional report, while omitting those below the threshold.

At 1750, the BS can generate and transmit a RRCReconfiguration message to the UE that comprises a NR SCG configuration and/or SCell configuration that includes at least one of the potential CA/DC frequencies/bands indicated in the measurement report of 1740.

Figure 18:
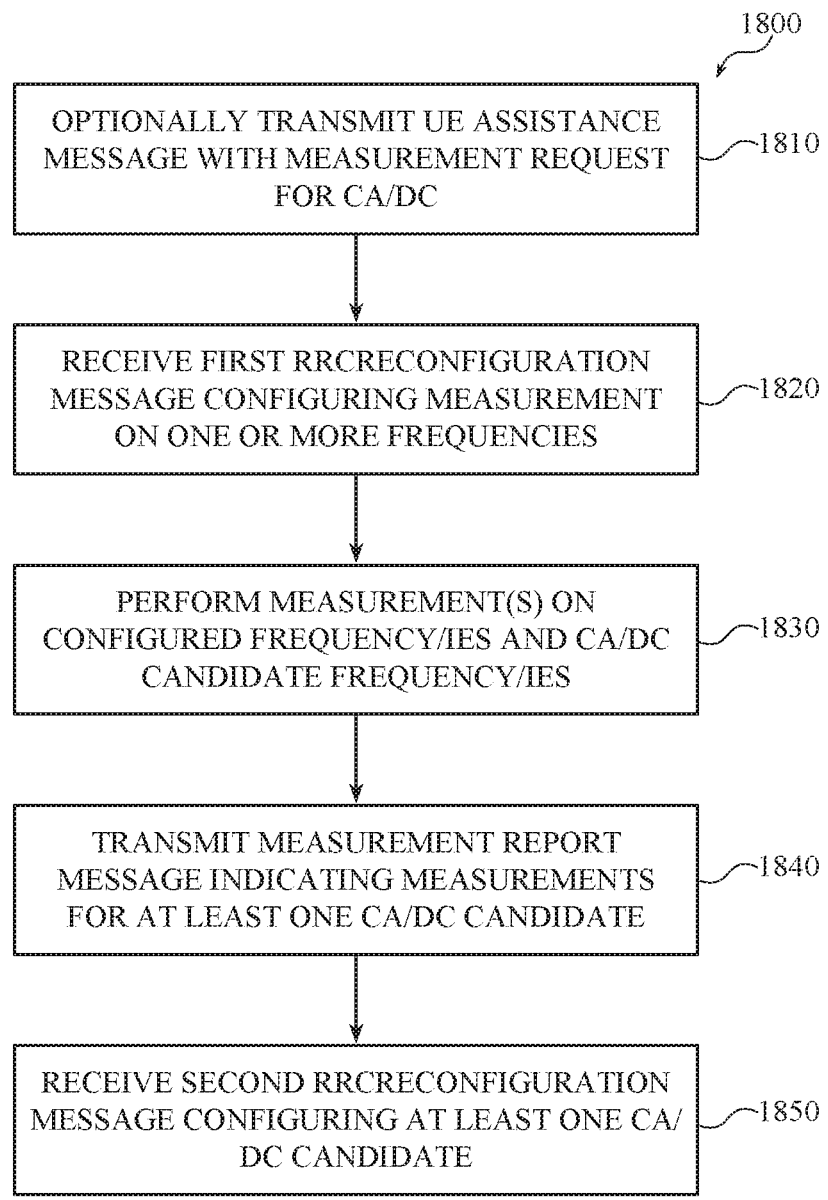
FIG. 18 illustrates a flow diagram of an example method or process employable at a UE that facilitates one or more enhancements discussed herein for measurement in Connected mode, according to various aspects discussed herein.

Referring to FIG. 18, illustrated is a flow diagram of an example method or process 1800 employable at a UE that facilitates one or more enhancements discussed herein for measurement in Connected mode, according to various aspects discussed herein. In other aspects, a machine readable medium can store instructions associated with method 1800 that, when executed, can cause a UE (e.g., employing system 400$_{UE}$) to perform the acts of method 1800. Although method 1800 is provided as one specific example aspect of techniques discussed herein, it is to be appreciated that other specific example aspects can employ additional and/or alternative techniques.

At 1810, optionally, the UE can transmit a UE Assistance Information message that comprises a measurement request. In some embodiments, the measurement request can comprise one or more of: a single bit indicating the measurement request, a RAT for measurement, one or more potential sets of CA/DC frequencies for measurement, and/or one or more potential sets of CA/DC frequencies for measurement without a gap.

At 1820, the UE can receive a first RRCReconfiguration message comprising a measurement configuration that configures one or more sets of frequencies for measurements. The one or more sets of frequencies can comprise at least one serving frequency or neighboring cell on a serving frequency. The one or more sets of frequencies can comprise at least one CA/DC candidate. In various embodiments, the first RRCReconfiguration message can indicate that the measurement configuration is for a CA/DC purpose.

At 1830, the UE can perform measurements on the one or more sets of frequencies configured via the first RRCReconfiguration message, which can include the at least one CA/DC candidate in some embodiments. In some embodiments, the one or more sets of configured frequencies do not include CA/DC candidates, but the UE can also perform measurements on at least one CA/DC candidate determined via SIB(s) or through other information at the UE. Measurements can be performed so as not to interrupt ongoing transmissions (e.g., without a measurement gap, during discontinuous reception (DRX) inactive time, etc.).

At 1840, the UE can transmit a measurement report message that indicates at least some of the sets of frequencies measured at 1830 and associated measurements on the reported set(s) of frequencies. In some embodiments, the measurement report can comprise a serving frequency or a neighboring cell on serving frequencies and at least one CA/DC candidate. In some embodiments, the UE can report measurements for CA/DC candidates that have at least a threshold radio link quality (e.g., wherein the threshold can be configured in the first RRCReconfiguration message at 1820, etc.). In some embodiments, the UE can report all measured CA/DC candidates.

At 1850, the UE can receive a second RRCReconfiguration message that configures the UE with at least one of the CA/DC candidates, for example, for a SCell configuration, a SCG configuration, or some other CA/DC configuration.

Additionally or alternatively, method 1800 can include one or more other acts described herein in connection with various aspects of a UE and/or system $400_{UE}$.

Figure 19:
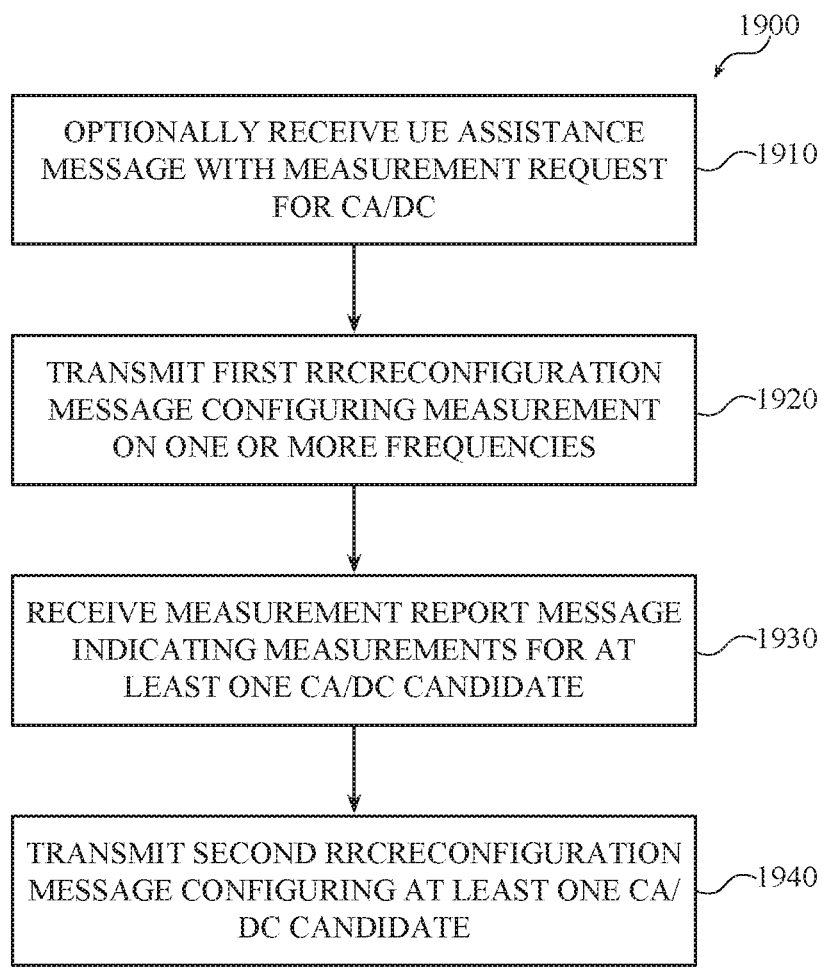
FIG. 19 illustrates a flow diagram of an example method or process employable at a BS that facilitates one or more enhancements discussed herein for measurement by a UE in Connected mode, according to various aspects discussed herein.

Referring to FIG. 19, illustrated is a flow diagram of an example method or process 1900 employable at a BS that facilitates one or more enhancements discussed herein for measurement by a UE in Connected mode, according to various aspects discussed herein. In other aspects, a machine readable medium can store instructions associated with method 1900 that, when executed, can cause a BS (e.g., employing system $400_{BS}$) to perform the acts of method 1900. Although method 1900 is provided as one specific example aspect of techniques discussed herein, it is to be appreciated that other specific example aspects can employ additional and/or alternative techniques.

At 1910, optionally, the BS can receive a UE Assistance Information message that comprises a measurement request. In some embodiments, the measurement request can comprise one or more of: a single bit indicating the measurement request, a RAT for measurement, one or more potential sets of CA/DC frequencies for measurement, and/or one or more potential sets of CA/DC frequencies for measurement without a gap.

At 1920, the BS can transmit a first RRCReconfiguration message comprising a measurement configuration that configures one or more sets of frequencies for measurements. The one or more sets of frequencies can comprise at least one serving frequency or neighboring cell on a serving frequency. The one or more sets of frequencies can comprise at least one CA/DC candidate. In various embodiments, the first RRCReconfiguration message can indicate that the measurement configuration is for a CA/DC purpose.

At 1930, the BS can receive a measurement report message that indicates at least some sets of frequencies measured by the UE based on the first RRCReconfiguration message, along with associated measurements on the reported set(s) of frequencies. In some embodiments, the measurement report can comprise a serving frequency or a neighboring cell on serving frequencies and at least one CA/DC candidate. In some embodiments, the UE can report measurements for CA/DC candidates that have at least a threshold radio link quality (e.g., wherein the threshold can be configured in the first RRCReconfiguration message at 1920, etc.). In some embodiments, the UE can report all measured CA/DC candidates.

At 1940, the BS can transmit a second RRCReconfiguration message that configures the UE with at least one of the CA/DC candidates, for example, for a SCell configuration, a SCG configuration, or some other CA/DC configuration.

Additionally or alternatively, method 1900 can include one or more other acts described herein in connection with various aspects of a BS and/or system $400_{BS}$.

Additional Examples

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to aspects and examples described.

Example 1 is a baseband processor configured to perform operations comprising: optionally generating a UE Assistance Information message for transmission, wherein the UE Assistance Information message comprises a measurement request; receiving a first RRCReconfiguration message comprising a measConfig information element (IE); performing one or more measurements on each of one or more sets of frequencies based at least on the measConfig IE, wherein the one or more sets of frequencies comprise a set of non-serving frequencies associated with a neighboring cell; generating a MeasurementReport message for transmission, wherein the MeasurementReport message indicates the one or more measurements on at least one set of the one or more sets of frequencies, wherein the one or more sets of frequencies comprises a set of serving frequencies for one of a serving cell or the neighboring cell and the set of non-serving frequencies associated with the neighboring cell; and receiving a second RRCReconfiguration message that configures the UE with the at least one set of the one or more sets of frequencies.

Example 2 comprises the subject matter of any variation of any of example(s) 1, wherein the first RRCReconfiguration message is received in response to the UE Assistance Information message.

Example 3 comprises the subject matter of any variation of any of example(s) 1-2, wherein the measurement request comprises one or more of: a single bit that indicates the measurement request, an indication of a Radio Access Technology (RAT) for measurement, the one or more sets of frequencies, or a first set of frequencies of the one or more sets of frequencies for measurement without a measurement gap.

Example 4 comprises the subject matter of any variation of any of example(s) 1-3, wherein the measConfig IE configures the UE to measure the set of non-serving frequencies associated with the neighboring cell, wherein the first RRCReconfiguration message indicates a purpose of one or more of Carrier Aggregation (CA) or Dual Connectivity (DC), wherein the purpose is indicated via one or more of a measurement report configuration or a measurement object configuration.

Example 5 comprises the subject matter of any variation of any of example(s) 1-4, wherein the operations further comprise, based at least on the measConfig IE, beginning performing the one or more measurements on each of the one or more sets of frequencies one of: immediately after receiving the first RRCReconfiguration message or in response to a determination by the UE of a configuration for one or more of Carrier Aggregation (CA) or Dual Connectivity (DC).

Example 6 comprises the subject matter of any variation of any of example(s) 1-5, wherein the operations comprise performing the one or more measurements on each of the one or more sets of frequencies one of: without a measurement gap or during a Discontinuous Reception (DRX) Inactive time.

Example 7 comprises the subject matter of any variation of any of example(s) 1-6, wherein the measConfig IE indicates the set of non-serving frequencies associated with the neighboring cell via a measurement object associated with the set of serving frequencies.

Example 8 comprises the subject matter of any variation of any of example(s) 1-7, wherein the at least one set of the one or more sets of frequencies comprises the set of non-serving frequencies when the one or more measurements for the set of non-serving frequencies exceed a configured threshold value for the one or more measurements.

Example 9 comprises the subject matter of any variation of any of example(s) 1-8, wherein the operations further comprise determining the set of non-serving frequencies from a System Information Block (SIB) associated with neighbor cell measurement.

Example 10 is a machine-readable medium comprising instructions that, when executed, cause a User Equipment (UE) to: optionally transmit a UE Assistance Information message comprising a measurement request; receive a first RRCReconfiguration message comprising a measConfig information element (IE); perform one or more measurements on each of one or more sets of frequencies based at least on the measConfig IE, wherein the one or more sets of frequencies comprise a set of non-serving frequencies associated with a neighboring cell; transmit a MeasurementReport message that indicates the one or more measurements on at least one set of the one or more sets of frequencies, wherein the one or more sets of frequencies comprises a set of serving frequencies for one of a serving cell or the neighboring cell and the set of non-serving frequencies associated with the neighboring cell; and receive a second RRCReconfiguration message that configures the UE with the at least one set of the one or more sets of frequencies.

Example 11 comprises the subject matter of any variation of any of example(s) 10, wherein the first RRCReconfiguration message is received in response to the UE Assistance Information message.

Example 12 comprises the subject matter of any variation of any of example(s) 10-11, wherein the measurement request comprises one or more of: a single bit that indicates the measurement request, an indication of a Radio Access Technology (RAT) for measurement, the one or more sets of frequencies, or a first set of frequencies of the one or more sets of frequencies for measurement without a measurement gap.

Example 13 comprises the subject matter of any variation of any of example(s) 10-12, wherein the measConfig IE configures the UE to measure the set of non-serving frequencies associated with the neighboring cell, wherein the first RRCReconfiguration message indicates a purpose of one or more of Carrier Aggregation (CA) or Dual Connectivity (DC), wherein the purpose is indicated via one or more of a measurement report configuration or a measurement object configuration.

Example 14 comprises the subject matter of any variation of any of example(s) 10-13, wherein the instructions, when executed, further cause the UE to, based at least on the measConfig IE, begin performing the one or more measurements on each of the one or more sets of frequencies one of: immediately after receiving the first RRCReconfiguration message or in response to a determination by the UE of a configuration for one or more of Carrier Aggregation (CA) or Dual Connectivity (DC).

Example 15 comprises the subject matter of any variation of any of example(s) 10-14, wherein the instructions, when executed, cause the UE to perform the one or more measurements on each of the one or more sets of frequencies one of: without a measurement gap or during a Discontinuous Reception (DRX) Inactive time.

Example 16 comprises the subject matter of any variation of any of example(s) 10-15, wherein the measConfig IE indicates the set of non-serving frequencies associated with the neighboring cell via a measurement object associated with the set of serving frequencies.

Example 17 comprises the subject matter of any variation of any of example(s) 10-16, wherein the at least one set of the one or more sets of frequencies comprises the set of non-serving frequencies when the one or more measurements for the set of non-serving frequencies exceed a configured threshold value for the one or more measurements.

Example 18 comprises the subject matter of any variation of any of example(s) 10-17, wherein the instructions, when executed, further cause the UE to determine the set of non-serving frequencies from a System Information Block (SIB) associated with neighbor cell measurement.

Example 19 is a user equipment (UE) device comprising a processor configured to perform operations comprising: optionally transmitting a UE Assistance Information message comprising a measurement request; receiving a first RRCReconfiguration message comprising a measConfig information element (IE); performing one or more measurements on each of on one or more frequencies based at least on the RRC measConfig IE, wherein the one or more frequencies comprise at least one non-serving frequency associated with a neighboring cell; transmitting a MeasurementReport message that indicates the one or more measurements for at least one of the one or more frequencies; and receiving a second RRCReconfiguration message that configures the UE with the at least one of the one or more frequencies.

Example 20 comprises the subject matter of any variation of any of example(s) 19, wherein the first RRCReconfiguration message is received in response to the UE Assistance Information message.

Example 21 comprises the subject matter of any variation of any of example(s) 19-20, wherein the measurement request comprises one or more of: a single bit that indicates the measurement request, an indication of a Radio Access Technology (RAT) for measurement, the one or more sets of frequencies, or a first set of frequencies of the one or more sets of frequencies for measurement without a measurement gap.

Example 22 comprises the subject matter of any variation of any of example(s) 19-21, wherein the measConfig IE configures the UE to measure the set of non-serving frequencies associated with the neighboring cell, wherein the first RRCReconfiguration message indicates a purpose of one or more of Carrier Aggregation (CA) or Dual Connectivity (DC), wherein the purpose is indicated via one or more of a measurement report configuration or a measurement object configuration.

Example 23 comprises the subject matter of any variation of any of example(s) 19-22, wherein the operations further comprise, based at least on the measConfig IE, beginning performing the one or more measurements on each of the one or more sets of frequencies one of: immediately after receiving the first RRCReconfiguration message or in response to a determination by the UE of a configuration for one or more of Carrier Aggregation (CA) or Dual Connectivity (DC).

Example 24 comprises the subject matter of any variation of any of example(s) 19-23, wherein the operations comprise performing the one or more measurements on each of the one or more sets of frequencies one of: without a measurement gap or during a Discontinuous Reception (DRX) Inactive time.

Example 25 comprises the subject matter of any variation of any of example(s) 19-24, wherein the measConfig IE indicates the set of non-serving frequencies associated with the neighboring cell via a measurement object associated with the set of serving frequencies.

Example 26 comprises the subject matter of any variation of any of example(s) 19-25, wherein the at least one set of the one or more sets of frequencies comprises the set of non-serving frequencies when the one or more measurements for the set of non-serving frequencies exceed a configured threshold value for the one or more measurements.

Example 27 comprises the subject matter of any variation of any of example(s) 19-26, wherein the operations further comprise determining the set of non-serving frequencies from a System Information Block (SIB) associated with neighbor cell measurement.

Example 28 is a baseband processor configured to perform operations comprising: receiving a first RRCReconfiguration message comprising a measConfig information element (IE); performing one or more measurements on each of one or more sets of frequencies based at least on the measConfig IE, wherein the one or more sets of frequencies comprise a set of non-serving frequencies associated with a neighboring cell; generating a MeasurementReport message for transmission, wherein the MeasurementReport message indicates the one or more measurements on at least one set of the one or more sets of frequencies, wherein the one or more sets of frequencies comprises a set of serving frequencies for one of a serving cell or the neighboring cell and the set of non-serving frequencies associated with the neighboring cell; and receiving a second RRCReconfiguration message that configures the UE with the at least one set of the one or more sets of frequencies.

Example 29 comprises the subject matter of any variation of any of example(s) 28, wherein the operations further comprise generating a UE Assistance Information message for transmission, wherein the UE Assistance Information message comprises a measurement request, and wherein the first RRCReconfiguration message is received in response to the UE Assistance Information message.

Example 30 comprises the subject matter of any variation of any of example(s) 28-29, wherein the measurement request comprises one or more of: a single bit that indicates the measurement request, an indication of a Radio Access Technology (RAT) for measurement, the one or more sets of frequencies, or a first set of frequencies of the one or more sets of frequencies for measurement without a measurement gap.

Example 31 comprises the subject matter of any variation of any of example(s) 28-30, wherein the measConfig IE configures the UE to measure the set of non-serving frequencies associated with the neighboring cell, wherein the first RRCReconfiguration message indicates a purpose of one or more of Carrier Aggregation (CA) or Dual Connectivity (DC), wherein the purpose is indicated via one or more of a measurement report configuration or a measurement object configuration.

Example 32 comprises the subject matter of any variation of any of example(s) 28-31, wherein the operations further comprise, based at least on the measConfig IE, beginning performing the one or more measurements on each of the one or more sets of frequencies one of: immediately after receiving the first RRCReconfiguration message or in response to a determination by the UE of a configuration for one or more of Carrier Aggregation (CA) or Dual Connectivity (DC).

Example 33 comprises the subject matter of any variation of any of example(s) 28-32, wherein the operations comprise performing the one or more measurements on each of the one or more sets of frequencies one of: without a measurement gap or during a Discontinuous Reception (DRX) Inactive time.

Example 34 comprises the subject matter of any variation of any of example(s) 28-33, wherein the measConfig IE indicates the set of non-serving frequencies associated with the neighboring cell via a measurement object associated with the set of serving frequencies.

Example 35 comprises the subject matter of any variation of any of example(s) 28-34, wherein the at least one set of the one or more sets of frequencies comprises the set of non-serving frequencies when the one or more measurements for the set of non-serving frequencies exceed a configured threshold value for the one or more measurements.

Example 36 comprises the subject matter of any variation of any of example(s) 28-35, wherein the operations further comprise determining the set of non-serving frequencies from a System Information Block (SIB) associated with neighbor cell measurement.

Example 37 comprises an apparatus comprising means for executing any of the described operations of examples 1-36.

Example 38 comprises a machine readable medium that stores instructions for execution by a processor to perform any of the described operations of examples 1-36.

Example 39 comprises an apparatus comprising: a memory interface; and processing circuitry configured to: perform any of the described operations of examples 1-36.

Example 40 comprises a User Equipment (UE) configured to execute any of the described operations of examples 1-36.

Example 41 is a baseband processor configured to perform operations comprising: receiving a UE Assistance Information message comprising a measurement request; generating a first RRCReconfiguration message for transmission, wherein the first RRCReconfiguration message comprises a measConfig information element (IE); receiving a MeasurementReport message from a User Equipment (UE) that indicates one or more measurements on one or more sets of frequencies, wherein the one or more sets of frequencies comprise a set of serving frequencies for one of a serving cell or the neighboring cell and a set of non-serving frequencies for the UE, wherein the set of non-serving frequencies are associated with the neighboring cell; and generating a second RRCReconfiguration message for transmission, wherein the second RRCReconfiguration message configures the UE with at least one set of the one or more sets of frequencies.

Example 42 comprises the subject matter of any variation of any of example(s) 41, wherein the first RRCReconfiguration message is generated in response to the UE Assistance Information message.

Example 43 comprises the subject matter of any variation of any of example(s) 41-42, wherein the measurement request comprises one or more of: a single bit that indicates the measurement request, an indication of a Radio Access Technology (RAT) for measurement, the one or more sets of frequencies, or a first set of frequencies of the one or more sets of frequencies for measurement without a measurement gap.

Example 44 comprises the subject matter of any variation of any of example(s) 41-43, wherein the measConfig IE configures the UE to measure the set of non-serving frequencies associated with the neighboring cell, wherein the first RRCReconfiguration message indicates a purpose of one or more of Carrier Aggregation (CA) or Dual Connectivity (DC), wherein the purpose is indicated via one or more of a measurement report configuration or a measurement object configuration.

Example 45 comprises the subject matter of any variation of any of example(s) 41-44, wherein the measConfig IE indicates the set of non-serving frequencies associated with the neighboring cell via a measurement object associated with the set of serving frequencies.

Example 46 comprises the subject matter of any variation of any of example(s) 41-45, wherein the one or more sets of frequencies comprises the set of non-serving frequencies when the one or more measurements for the set of non-serving frequencies exceed a configured threshold value for the one or more measurements.

Example 47 comprises the subject matter of any variation of any of example(s) 41-46, wherein the operations further comprise generating a System Information Block (SIB) associated with neighbor cell measurement that indicates the set of non-serving frequencies.

Example 48 is a machine-readable medium comprising instructions that, when executed, cause a Base Station (BS) to: receive a UE Assistance Information message comprising a measurement request; transmit a first RRCReconfiguration message comprising a measConfig information element (IE); receive a MeasurementReport message from a User Equipment (UE) that indicates one or more measurements on one or more sets of frequencies, wherein the one or more sets of frequencies comprise a set of serving frequencies for one of a serving cell or the neighboring cell and a set of non-serving frequencies for the UE, wherein the set of non-serving frequencies are associated with the neighboring cell; and transmit a second RRCReconfiguration message that configures the UE with at least one set of the one or more sets of frequencies.

Example 49 comprises the subject matter of any variation of any of example(s) 48, wherein the first RRCReconfiguration message is generated in response to the UE Assistance Information message.

Example 50 comprises the subject matter of any variation of any of example(s) 48-49, wherein the measurement request comprises one or more of: a single bit that indicates the measurement request, an indication of a Radio Access Technology (RAT) for measurement, the one or more sets of frequencies, or a first set of frequencies of the one or more sets of frequencies for measurement without a measurement gap.

Example 51 comprises the subject matter of any variation of any of example(s) 48-50, wherein the measConfig IE configures the UE to measure the set of non-serving frequencies associated with the neighboring cell, wherein the first RRCReconfiguration message indicates a purpose of one or more of Carrier Aggregation (CA) or Dual Connectivity (DC), wherein the purpose is indicated via one or more of a measurement report configuration or a measurement object configuration.

Example 52 comprises the subject matter of any variation of any of example(s) 48-51, wherein the measConfig IE indicates the set of non-serving frequencies associated with the neighboring cell via a measurement object associated with the set of serving frequencies.

Example 53 comprises the subject matter of any variation of any of example(s) 48-52, wherein the one or more sets of frequencies comprises the set of non-serving frequencies when the one or more measurements for the set of non-serving frequencies exceed a configured threshold value for the one or more measurements.

Example 54 comprises the subject matter of any variation of any of example(s) 48-53, wherein the instructions, when executed, further cause the UE to generate a System Information Block (SIB) associated with neighbor cell measurement that indicates the set of non-serving frequencies.

Example 55 is a Base Station (BS) device comprising a processor configured to perform operations comprising: receiving a UE Assistance Information message comprising a measurement request; transmitting a first RRCReconfiguration message comprising a measConfig information element (IE); receiving a MeasurementReport message from a User Equipment (UE) that indicates one or more measurements on one or more sets of frequencies, wherein the one or more sets of frequencies comprise a set of serving frequencies for one of a serving cell or the neighboring cell and a set of non-serving frequencies for the UE, wherein the set of non-serving frequencies are associated with the neighboring cell; and transmitting a second RRCReconfiguration message that configures the UE with at least one set of the one or more sets of frequencies.

Example 56 comprises the subject matter of any variation of any of example(s) 55, wherein the first RRCReconfiguration message is generated in response to the UE Assistance Information message.

Example 57 comprises the subject matter of any variation of any of example(s) 55-56, wherein the measurement request comprises one or more of: a single bit that indicates the measurement request, an indication of a Radio Access Technology (RAT) for measurement, the one or more sets of frequencies, or a first set of frequencies of the one or more sets of frequencies for measurement without a measurement gap.

Example 58 comprises the subject matter of any variation of any of example(s) 55-57, wherein the measConfig IE configures the UE to measure the set of non-serving frequencies associated with the neighboring cell, wherein the first RRCReconfiguration message indicates a purpose of one or more of Carrier Aggregation (CA) or Dual Connectivity (DC), wherein the purpose is indicated via one or more of a measurement report configuration or a measurement object configuration.

Example 59 comprises the subject matter of any variation of any of example(s) 55-58, wherein the measConfig IE indicates the set of non-serving frequencies associated with the neighboring cell via a measurement object associated with the set of serving frequencies.

Example 60 comprises the subject matter of any variation of any of example(s) 55-59, wherein the one or more sets of frequencies comprises the set of non-serving frequencies when the one or more measurements for the set of non-serving frequencies exceed a configured threshold value for the one or more measurements.

Example 61 comprises the subject matter of any variation of any of example(s) 55-60, wherein the operations further comprise generating a System Information Block (SIB) associated with neighbor cell measurement that indicates the set of non-serving frequencies.

Example 62 is a Base Station (BS) device comprising a processor configured to perform operations comprising: transmitting a first RRCReconfiguration message comprising a measConfig information element (IE); receiving a MeasurementReport message from a User Equipment (UE) that indicates one or more measurements on one or more sets of frequencies, wherein the one or more sets of frequencies comprise a set of serving frequencies for one of a serving cell or the neighboring cell and a set of non-serving frequencies for the UE, wherein the set of non-serving frequencies are associated with the neighboring cell; and transmitting a second RRCReconfiguration message that configures the UE with at least one set of the one or more sets of frequencies.

Example 63 comprises the subject matter of any variation of any of example(s) 62, wherein the operations further comprise receiving a UE Assistance Information message comprising a measurement request, wherein the first RRCReconfiguration message is generated in response to the UE Assistance Information message.

Example 64 comprises the subject matter of any variation of any of example(s) 62-63, wherein the measurement request comprises one or more of: a single bit that indicates the measurement request, an indication of a Radio Access Technology (RAT) for measurement, the one or more sets of frequencies, or a first set of frequencies of the one or more sets of frequencies for measurement without a measurement gap.

Example 65 comprises the subject matter of any variation of any of example(s) 62-64, wherein the measConfig IE configures the UE to measure the set of non-serving frequencies associated with the neighboring cell, wherein the first RRCReconfiguration message indicates a purpose of one or more of Carrier Aggregation (CA) or Dual Connectivity (DC), wherein the purpose is indicated via one or more of a measurement report configuration or a measurement object configuration.

Example 66 comprises the subject matter of any variation of any of example(s) 62-65, wherein the measConfig IE indicates the set of non-serving frequencies associated with the neighboring cell via a measurement object associated with the set of serving frequencies.

Example 67 comprises the subject matter of any variation of any of example(s) 62-66, wherein the one or more sets of frequencies comprises the set of non-serving frequencies when the one or more measurements for the set of non-serving frequencies exceed a configured threshold value for the one or more measurements.

Example 68 comprises the subject matter of any variation of any of example(s) 62-67, wherein the operations further comprise generating a System Information Block (SIB) associated with neighbor cell measurement that indicates the set of non-serving frequencies.

Example 69 comprises an apparatus comprising means for executing any of the described operations of examples 41-68.

Example 70 comprises a machine readable medium that stores instructions for execution by a processor to perform any of the described operations of examples 41-68.

Example 71 comprises an apparatus comprising: a memory interface; and processing circuitry configured to: perform any of the described operations of examples 41-68.

Example 72 comprises a Base Station (BS) configured to execute any of the described operations of examples 41-68.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A baseband processor, when executing instructions stored in a memory, configured to perform operations comprising:
    receiving a first RRCReconfiguration message comprising a measConfig information element (IE), wherein the first RRCReconfiguration message indicates a purpose of one or more of Carrier Aggregation (CA) or Dual Connectivity (DC), and wherein the measConfig IE configures one or more measurements on a set of non-serving frequencies associated with a neighboring cell;
    generating a MeasurementReport message that indicates the one or more measurements; and
    receiving a second RRCReconfiguration message that configures the one or more of CA or DC.

2. The baseband processor of claim 1, wherein the first RRCReconfiguration message is received in response to a measurement request.

3. The baseband processor of claim 2, wherein the measurement request comprises one or more of: a single bit that indicates the measurement request, an indication of a Radio Access Technology (RAT) for measurement, the set of non-serving frequencies, or a first set of frequencies of the set of non-serving frequencies for measurement without a measurement gap.

4. The baseband processor of claim 1, wherein the purpose is indicated via one or more of a measurement report configuration or a measurement object configuration.

5. The baseband processor of claim 1, wherein the operations further comprise, based at least on the measConfig IE, performing the one or more measurements after receiving the first RRCReconfiguration message.

6. The baseband processor of claim 1, wherein the operations comprise performing the one or more measurements without a measurement gap or during a Discontinuous Reception (DRX) Inactive time.

7. The baseband processor of claim 1, wherein the measConfig IE indicates the set of non-serving frequencies associated with the neighboring cell via a measurement object associated with a set of serving frequencies.

8. The baseband processor of claim 1, wherein the set of non-serving frequencies is configured in the MeasurementReport message when the one or more measurements for the set of non-serving frequencies exceed a configured threshold value for the one or more measurements.

9. The baseband processor of claim 1, wherein the operations further comprise determining the set of non-serving frequencies from a System Information Block (SIB) associated with neighbor cell measurement.

10. A user equipment (UE) device comprising:
a memory configured to store instructions; and
a processor, coupled to the memory, and when executing the instructions, configured to perform operations comprising:
generating, for transmission to a base station, a UE Assistance Information message comprising a measurement request;
receiving, from the base station, a first RRCReconfiguration message in response to the UE Assistance Information message, the first RRCReconfiguration message comprising a measConfig information element (IE), wherein the measConfig IE configures one or more measurements on a set of non-serving frequencies associated with a neighboring cell;
sending a MeasurementReport message that indicates the one or more measurements; and
receiving a second RRCReconfiguration message that configures the UE device with the neighboring cell.

11. The UE device of claim 10, wherein the measurement request comprises one or more of: a single bit that indicates the measurement request, an indication of a Radio Access Technology (RAT) for measurement, the set of non-serving frequencies, or a first set of frequencies of the set of non-serving frequencies for measurement without a measurement gap.

12. The UE device of claim 10, wherein the first RRCReconfiguration message indicates a purpose of one or more of Carrier Aggregation (CA) or Dual Connectivity (DC), wherein the purpose is indicated via one or more of a measurement report configuration or a measurement object configuration.

13. The UE device of claim 10, wherein the operations further comprise, based at least on the measConfig IE, performing the one or more measurements after receiving the first RRCReconfiguration message.

14. The UE device of claim 10, wherein the operations comprise performing the one or more measurements without a measurement gap or during a Discontinuous Reception (DRX) Inactive time.

15. The UE device of claim 10, wherein the measConfig IE indicates the set of non-serving frequencies associated with the neighboring cell via a measurement object associated with at least one serving frequency.

16. The UE device of any of claim 10, wherein the set of non-serving frequencies is configured in the MeasurementReport message when the one or more measurements for the set of non-serving frequencies exceed a configured threshold value for the one or more measurements.

17. The UE device of claim 10, wherein the operations further comprise determining the set of non-serving frequencies from a System Information Block (SIB) associated with neighbor cell measurement.

18. A baseband processor of a User Equipment (UE) configured to perform operations comprising:
receiving a first RRCReconfiguration message comprising a measConfig information element (IE), wherein the first RRCReconfiguration message explicitly indicates a purpose of one or more of Carrier Aggregation (CA) or Dual Connectivity (DC), wherein the measConfig IE configures one or more measurements on a set of non-serving frequencies associated with a neighboring cell;
generating a MeasurementReport message for transmission, wherein the MeasurementReport message indicates the one or more measurements; and
receiving a second RRCReconfiguration message that configures the UE with the one or more of CA or DC.

19. The baseband processor of claim 18, wherein the operations further comprise generating a UE Assistance Information message for transmission to a base station, wherein the UE Assistance Information message comprises a measurement request, and wherein the first RRCReconfiguration message is received in response to the UE Assistance Information message.

20. The baseband processor of claim 19, wherein the measurement request comprises one or more of: a single bit that indicates the measurement request, an indication of a Radio Access Technology (RAT) for measurement, or the set of non-serving frequencies for measurement without a measurement gap.

* * * * *